United States Patent
Li et al.

(10) Patent No.: US 10,904,947 B2
(45) Date of Patent: Jan. 26, 2021

(54) MESSAGE AND SYSTEM FOR APPLICATION FUNCTION INFLUENCE ON TRAFFIC ROUTING

(71) Applicants: Xu Li, Nepean (CA); Ngoc Dung Dao, Ottawa (CA); Patrice Hede, Saint-Germain-en-Laye (FR); Hang Zhang, Nepean (CA)

(72) Inventors: Xu Li, Nepean (CA); Ngoc Dung Dao, Ottawa (CA); Patrice Hede, Saint-Germain-en-Laye (FR); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/412,162

(22) Filed: May 14, 2019

(65) Prior Publication Data
US 2019/0357301 A1 Nov. 21, 2019

Related U.S. Application Data

(60) Provisional application No. 62/672,473, filed on May 16, 2018.

(51) Int. Cl.
*H04W 80/12* (2009.01)
*H04M 15/00* (2006.01)
(Continued)

(52) U.S. Cl.
CPC ........... *H04W 80/12* (2013.01); *H04M 15/66* (2013.01); *H04W 40/20* (2013.01); *H04W 40/34* (2013.01); *H04W 80/10* (2013.01)

(58) Field of Classification Search
CPC ..... H04M 15/66; H04M 15/00; H04W 40/20; H04W 80/12; H04W 40/34; H04W 80/10; H04L 12/14; H04L 12/1407
See application file for complete search history.

(56) References Cited

U.S. PATENT DOCUMENTS

2016/0174198 A1 6/2016 Akiyoshi et al.
2017/0366399 A1 12/2017 Li et al.
(Continued)

OTHER PUBLICATIONS

3GPP TR 23.726 V0.2.0 (Mar. 2018),3rd Generation Partnership Project;Technical Specification Group Services and System Aspects;Study on Enhancing Topology of SMF and UPF in 5G Networks (Release 16),total 32 pages.
(Continued)

*Primary Examiner* — Brian D Nguyen

(57) ABSTRACT

An aspect of the disclosure provides for a method for user equipment (UE) internet protocol (IP) address management. The method includes sending by an application function (AF), a request to a policy control function (PCF), the request including information identifying traffic and an indication that a UE IP address associated with the traffic should be preserved. The method further includes sending by the PCF, to a session management function (SMF) being responsible for managing a Protocol Data Unit (PDU) session associated with the traffic, a policy and charging control (PCC) rule including the indication. In some embodiments, the request is sent by the AF to the PCF via a network exposure function (NEF). In some embodiments, the method further includes managing, by the SMF, the UE IP address according to the PCC rule. In some embodiments, the managing includes preserving the UE IP address for a PDU session associated with the traffic. In some embodiments, the preserving includes preventing reselection of a protocol data unit (PDU) session anchor (PSA) to which the UE IP address is associated.

17 Claims, 16 Drawing Sheets

(51) Int. Cl.
*H04W 40/20* (2009.01)
*H04W 40/34* (2009.01)
*H04W 80/10* (2009.01)

(56) References Cited

U.S. PATENT DOCUMENTS

2018/0324577 A1* 11/2018 Faccin ................. H04W 48/18
2020/0053531 A1* 2/2020 Myhre ................. H04W 48/18
2020/0068391 A1* 2/2020 Liu ....................... H04L 9/3242
2020/0178048 A1* 6/2020 Kim ..................... H04W 48/08

OTHER PUBLICATIONS

S2-177385 Huawei et al., "TS 23.501: Clarification and correction of AF influence on traffic routing",3GPP TSG SA WG2 Meeting #123,Oct. 23-Oct. 27, 2017, Ljubljana, Slovenia,total 5 pages.
"System Architecture for the 5G System; Stage 2"; 3GPP TS 23.501 V15.1.0 (Mar. 2018).
"Procedures for the 5G System; Stage 2"; 3GPP TS 23.502 V15.1.0 (Mar. 2018).

* cited by examiner

MESSAGE AND SYSTEM FOR APPLICATION FUNCTION INFLUENCE ON TRAFFIC ROUTING

CROSS-REFERENCE TO RELATED APPLICATIONS

This application claims the benefit of prior to U.S. provisional Patent Application No. 62/672,473 filed on May 16, 2018, entitled "APPLICATION FUNCTION INFLUENCE ON TRAFFIC ROUTING FOR JOINT USER PLANE PATH OPTIMIZATION FOR A GROUP OF UES" the contents of which are incorporated herein by reference in their entirety.

FIELD OF THE INVENTION

The present invention pertains to the field of wireless communications networks, and in particular to systems and methods application function influence on traffic routing for joint user plane path optimization for a group of User Equipment (UE).

BACKGROUND

In Release 15 of Technical Standard 3GPP TS23.501, individual Protocol Data Unit (PDU) sessions are managed independently, potentially by multiple Session Management Functions (SMFs) that have no relation with one another. The independent management of PDU sessions implies a lack of correlation among the PDU sessions. Similarly, the SMFs will typically select the User Plane (UP) path of a particular PDU session independently of the UP paths selected by other SMFs. In some scenarios, this may result in inefficient end-to-end UP paths. For example, IP Multimedia Subsystem (IMS) scenarios may involve an end-to-end UP path between a pair of User Equipment (UE), via either a local User Plane Function (UPF) or a Data Network Access Identifier (DNAI). The respective UP paths between each UE and the involved UPF or DNAI will typically be independently selected by different SMFs, and this may result in an inefficient end-to-end UP path.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide methods and systems for application function (AF) influence of Protocol Data Unit (PDU) sessions. Some embodiments provide user equipment (UE) internet protocol (IP) address management. Some embodiments enable correlation of UP paths associated with correlated PDU sessions.

An aspect of the disclosure provides for a method for user equipment (UE) internet protocol (IP) address management. The method includes sending by an application function (AF), a request to a policy control function (PCF), the request including information identifying traffic and an indication that a UE IP address associated with the traffic should be preserved. The method further includes sending by the PCF, to a session management function (SMF) being responsible for managing a Protocol Data Unit (PDU) session associated with the traffic, a policy and charging control (PCC) rule including the indication. In some embodiments, the request is sent by the AF to the PCF via a network exposure function (NEF). In some embodiments, the method further includes managing, by the SMF, the UE IP address according to the PCC rule. In some embodiments, the managing includes preserving the UE IP address for a PDU session associated with the traffic. In some embodiments, the preserving includes preventing reselection of a protocol data unit (PDU) session anchor (PSA) to which the UE IP address is associated. In some embodiments, the preventing reselection of the PSA includes receiving a trigger to modifying a path which would include a PSA reselection. In some embodiments, the preventing reselection of the PSA further includes, in response, selecting a new path which includes the PSA.

Another aspect of the disclosure provides for a method for user equipment (UE) internet protocol (IP) address management, the method performed by a session management function (SMF) configured to manage a Protocol Data Unit (PDU) session associated with traffic. The method includes receiving a policy and charging control (PCC) rule from a policy control function (PCF), the PCC rule including an indication that a UE IP address associated with the traffic should be preserved. The method further includes managing the UE IP address according to the PCC rule, the managing including at least one of: preserving the UE IP address for a PDU session associated with the traffic; and preventing reselection of a protocol data unit (PDU) session anchor (PSA) to which the UE IP address is associated. In some embodiments, the PCC rule is associated with a request from an AF, the request including information identifying the traffic and the indication. In some embodiments the PSA is a UPF through which a UP path of the PDU session is connected to a data network (DN).

Another aspect of the disclosure provides for a network node including at least one network interface, at least one processor, and a non-transient computer readable memory for storing instructions which when executed by the at least one processor configure the network node to execute the methods disclosed herein. For example, such a network node is configured to receive a policy and charging control (PCC) rule from a policy control function (PCF), the PCC rule including an indication that a user equipment (UE) internet protocol (IP) address associated with traffic should be preserved. The network node is further configured to manage the UE IP address according to the PCC rule, the managing including at least one of: preserving the UE IP address for a protocol data unit (PDU) session associated with the traffic, and preventing reselection of a protocol data unit (PDU) session anchor (PSA) to which the UE IP address is associated. In some embodiments, the PCC rule is associated with a request from an AF, the request including information identifying the traffic and the indication. In some embodiments, the PSA is a UPF through which a UP path of the PDU session is connected to a data network (DN).

Another aspect of the disclosure provides for a method for user equipment (UE) internet protocol (IP) address management. The method includes sending by an application function (AF), a request to a policy control function (PCF), the request including information identifying traffic and an indication that a UE IP address associated with the traffic should be preserved.

Another aspect of the disclosure provides for a network node including at least one network interface, at least one processor, and a non-transient computer readable memory for storing instructions which when executed by the at least one processor configure the network node to execute the methods disclosed herein. For example, such a network node is configured to send a request to a policy control function (PCF), the request including information identifying traffic and an indication that a user equipment (UE) internet protocol (IP) address associated with the traffic should be preserved.

Another aspect of the disclosure provides for a system for user equipment (UE) internet protocol (IP) address management. The system includes an application function (AF) and a policy control function (PCF). The system further includes the AF configured to send a request to a PCF, the request including information identifying traffic and an indication that a UE IP address associated with the traffic should be preserved. The system further includes the PCF configured to send to a session management function (SMF) being responsible for managing a Protocol Data Unit (PDU) session associated with the traffic, a policy and charging control (PCC) rule including the indication. In some embodiments, the system further includes a network exposure function (NEF); and wherein the AF is configured to send the request to the PCF via the NEF. In some embodiments, the system further includes the SMF, and wherein the SMF is configured for managing the UE IP address according to the PCC rule. In some embodiments, the system further includes the SMF, and wherein the SMF is configured for managing the UE IP address according to the PCC rule, including preserving the UE IP address for a PDU session associated with the traffic. In some embodiments, the system further includes the SMF, and wherein the SMF is configured for managing the UE IP address according to the PCC rule, including preventing reselection of a protocol data unit (PDU) session anchor (PSA) to which the UE IP address is associated.

Accordingly, another aspect of the present invention provides a control plane function that includes at least one processor, and a non-transitory computer readable memory storing software instructions configured to control the at least one processor to execute a process including: receiving an identification of two or more correlated PDU sessions; and interacting with one or more session management functions (SMFs) to correlate respective user plane paths of the correlated PDU sessions.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
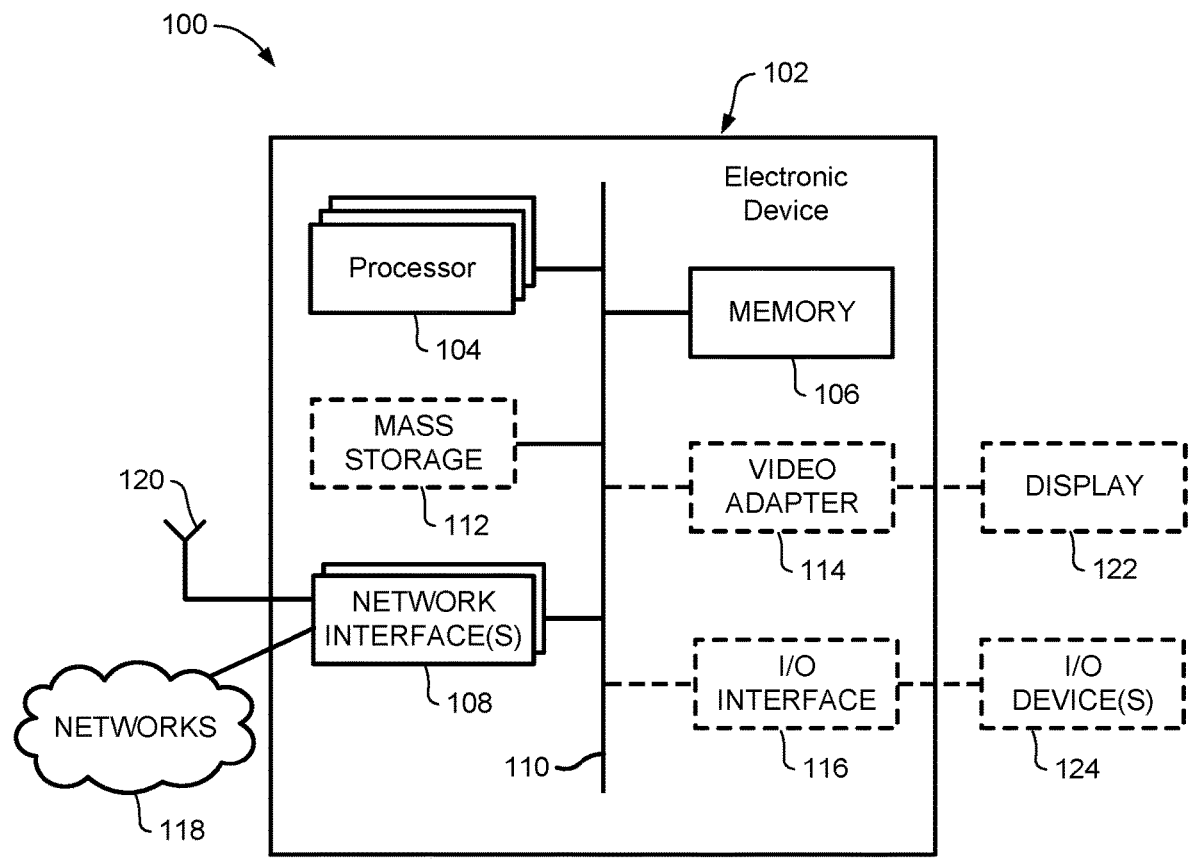
FIG. 1 is a block diagram of a computing system 100 that may be used for implementing devices and methods in accordance with representative embodiments of the present invention.

FIG. 1 is a block diagram of an electronic device (ED) 102 illustrated within a computing and communications environment 100 that may be used for implementing the devices and methods disclosed herein. In some embodiments, the electronic device may be an element of communications network infrastructure, such as a base station, for example a NodeB, an enhanced Node B (eNodeB), a next generation NodeB (sometimes referred to as a gNodeB or gNB), a home subscriber server (HSS), a gateway (GW) such as a packet gateway (PGW) or a serving gateway (SGW) or various other nodes or functions within an evolved packet core (EPC) network. In other embodiments, the electronic device may be a device that connects to network infrastructure over a radio interface, such as a mobile phone, smart phone or other such device that may be classified as a User Equipment (UE). In some embodiments, ED 102 may be a Machine Type Communications (MTC) device (also referred to as a machine-to-machine (m2m) device), or another such device that may be categorized as a UE despite not providing a direct service to a user. In some references, an ED may also be referred to as a mobile device, a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 102 typically includes a processor 104, such as a Central Processing Unit (CPU), and may further include specialized processors such as a Graphics Processing Unit (GPU) or other such processor, a memory 106, a network interface 108 and a bus 110 to connect the components of ED 102. ED 102 may optionally also include components such as a mass storage device 112, a video adapter 114, and an I/O interface 116 (shown in dashed lines).

The memory 106 may comprise any type of non-transitory system memory, readable by the processor 104, such as static random access memory (SRAM), dynamic random access memory (DRAM), synchronous DRAM (SDRAM), read-only memory (ROM), or a combination thereof. In an embodiment, the memory 106 may include more than one type of memory, such as ROM for use at boot-up, and DRAM for program and data storage for use while executing programs. The bus 110 may be one or more of any type of several bus architectures including a memory bus or memory controller, a peripheral bus, or a video bus.

The electronic device 102 may also include one or more network interfaces 108, which may include at least one of a wired network interface and a wireless network interface. As illustrated in FIG. 1, network interface 108 may include a wired network interface to connect to a network 118, and also may include a radio access network interface 120 for connecting to other devices over a radio link. When ED 102 is network infrastructure, the radio access network interface 120 may be omitted for nodes or functions acting as elements of the Core Network (CN) other than those at the radio edge (e.g. an eNB). When ED 102 is infrastructure at the radio edge of a network, both wired and wireless network interfaces may be included. When ED 102 is a wirelessly connected device, such as a User Equipment, radio access network interface 120 may be present and it may be supplemented by other wireless interfaces such as WiFi network interfaces. The network interfaces 108 allow the electronic device 102 to communicate with remote entities such as those connected to network 118.

The mass storage 112 may comprise any type of non-transitory storage device configured to store data, programs, and other information and to make the data, programs, and other information accessible via the bus 110. The mass storage 112 may comprise, for example, one or more of a solid state drive, hard disk drive, a magnetic disk drive, or an optical disk drive. In some embodiments, mass storage 112 may be remote to the electronic device 102 and accessible through use of a network interface such as interface 108. In the illustrated embodiment, mass storage 112 is distinct from memory 106 where it is included, and may generally perform storage tasks compatible with higher latency, but may generally provide lesser or no volatility. In some embodiments, mass storage 112 may be integrated with a heterogeneous memory 106.

The optional video adapter 114 and the I/O interface 116 (shown in dashed lines) provide interfaces to couple the electronic device 102 to external input and output devices. Examples of input and output devices include a display 122 coupled to the video adapter 114 and an I/O device 124 such as a touch-screen coupled to the I/O interface 116. Other devices may be coupled to the electronic device 102, and additional or fewer interfaces may be utilized. For example, a serial interface such as Universal Serial Bus (USB) (not shown) may be used to provide an interface for an external device. Those skilled in the art will appreciate that in embodiments in which ED 102 is part of a data center, I/O interface 116 and Video Adapter 114 may be virtualized and provided through network interface 108.

In some embodiments, electronic device 102 may be a standalone device, while in other embodiments electronic device 102 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

Figure 2:
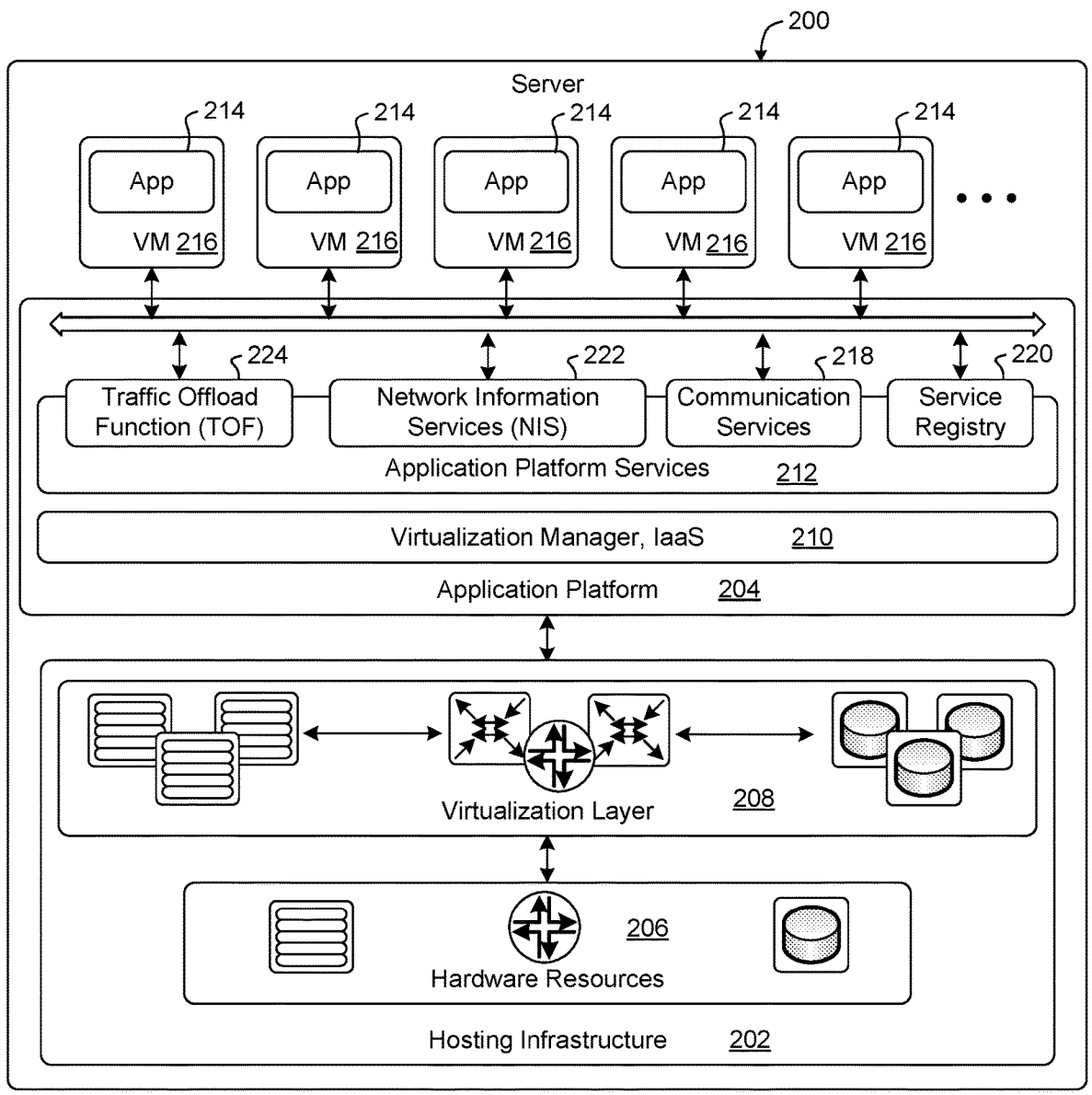
FIG. 2 is a block diagram schematically illustrating an architecture of a representative server usable in embodiments of the present invention.

FIG. 2 is a block diagram schematically illustrating an architecture of a representative server 200 usable in embodiments of the present invention. It is contemplated that the server 200 may be physically implemented as one or more computers, storage devices and routers (any or all of which may be constructed in accordance with the system 100 described above with reference to FIG. 1) interconnected together to form a local network or cluster, and executing suitable software to perform its intended functions. Those of ordinary skill will recognize that there are many suitable combinations of hardware and software that may be used for the purposes of the present invention, which are either known in the art or may be developed in the future. For this reason, a figure showing the physical server hardware is not included in this specification. Rather, the block diagram of FIG. 2 shows a representative functional architecture of a server 200, it being understood that this functional architecture may be implemented using any suitable combination of hardware and software.

As maybe seen in FIG. 2, the illustrated server 200 generally comprises a hosting infrastructure 202 and an application platform 204. The hosting infrastructure 202 comprises the physical hardware resources 206 (such as, for example, information processing, traffic forwarding and data storage resources) of the server 200, and a virtualization layer 208 that presents an abstraction of the hardware resources 206 to the Application Platform 204. The specific details of this abstraction will depend on the requirements of the applications being hosted by the Application layer (described below). Thus, for example, an application that provides traffic forwarding functions may be presented with an abstraction of the hardware resources 206 that simplifies the implementation of traffic forwarding policies in one or more routers. Similarly, an application that provides data storage functions may be presented with an abstraction of the hardware resources 206 that facilitates the storage and retrieval of data (for example using Lightweight Directory Access Protocol—LDAP).

The application platform 204 provides the capabilities for hosting applications and includes a virtualization manager 210 and application platform services 212. The virtualization manager 210 supports a flexible and efficient multi-tenancy run-time and hosting environment for applications 214 by providing Infrastructure as a Service (IaaS) facilities. In operation, the virtualization manager 210 may provide a security and resource "sandbox" for each application being hosted by the platform 204. Each "sandbox" may be implemented as a Virtual Machine (VM) image 216 that may include an appropriate operating system and controlled access to (virtualized) hardware resources 206 of the server 200. The application-platform services 212 provide a set of middleware application services and infrastructure services to the applications 214 hosted on the application platform 204, as will be described in greater detail below.

Applications 214 from vendors, service providers, and third-parties may be deployed and executed within a respective Virtual Machine 216. For example, MANO and SONAC (and its various functions such as SDT, SDP, and SDRA) may be implemented by means of one or more applications 214 hosted on the application platform 204 as described above. Communication between applications 214 and services in the server 200 may conveniently be designed according to the principles of Service-Oriented Architecture (SOA) known in the art.

Communication services 218 may allow applications 214 hosted on a single server 200 to communicate with the application-platform services 212 (through pre-defined Application Programming Interfaces (APIs) for example) and with each other (for example through a service-specific API).

A Service registry 220 may provide visibility of the services available on the server 200. In addition, the service registry 220 may present service availability (e.g. status of the service) together with the related interfaces and versions. This may be used by applications 214 to discover and locate the end-points for the services they require, and to publish their own service end-point for other applications to use.

Mobile-edge Computing allows cloud application services to be hosted alongside mobile network elements, and also facilitates leveraging of the available real-time network and radio information. Network Information Services (NIS) 222 may provide applications 214 with low-level network information. For example, the information provided by NIS 222 may be used by an application 214 to calculate and present high-level and meaningful data such as: cell-ID, location of the subscriber, cell load and throughput guidance.

A Traffic Off-Load Function (TOF) service 224 may prioritize traffic, and route selected, policy-based, user-data streams to and from applications 214. The TOF service 224 may be supplied to applications 224 in various ways, including: A Pass-through mode where (uplink and/or downlink) traffic is passed to an application 214 which can monitor, modify or shape it and then send it back to the original Packet Data Network (PDN) connection (e.g. 3GPP bearer); and an End-point mode where the traffic is terminated by the application 214 which acts as a server.

Figure 3:
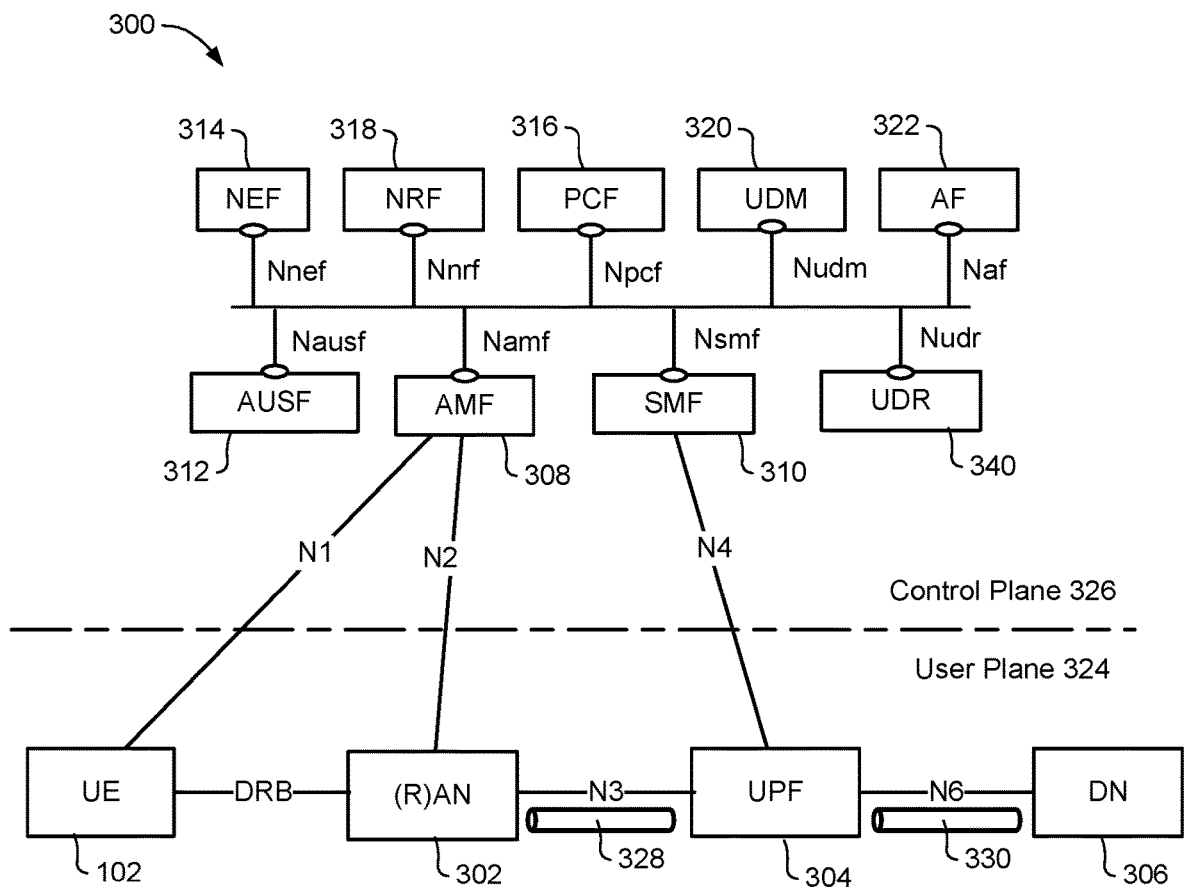
FIG. 3 is a block diagram illustrating a service-based view of a system architecture of a 5G Core Network.

FIG. 3 illustrates a service-based architecture 300 for a 5G or Next Generation Core Network (5GCN/NGCN/NCN). This illustration depicts logical connections between nodes and functions, and its illustrated connections should not be interpreted as direct physical connections. ED (or UE) 102 forms a radio access network connection with a (Radio) Access Network ((R)AN) node 302 (which may, for example, be an gNodeB (gNB)), which is connected to a User Plane (UP) Function (UPF) 304 such as a UP Gateway over a network interface providing a defined interface such as an N3 interface. UPF 304 provides a logical connection to a Data Network (DN) 306 over a network interface such as an N6 interface. The radio access network connection between the ED 102 and the (R)AN node 302 may be referred to as a Data Radio Bearer (DRB).

DN 306 may be a data network used to provide an operator service, or it may be outside the scope of the standardization of the Third Generation Partnership Project (3GPP), such as the Internet, a network used to provide third party service, and in some embodiments DN 306 may represent an Edge Computing network or resource, such as a Mobile Edge Computing (MEC) network.

ED 102 also connects to the Access and Mobility Management Function (AMF) 308 through a logical Ni connection (although the physical path of the connection is not direct). The AMF 308 is responsible for authentication and authorization of access requests, as well as mobility management functions. The AMF 308 may perform other roles and functions as defined by the 3GPP Technical Specification (TS) 23.501. In a service based view, AMF 308 can communicate with other core network control plane functions through a service based interface denoted as Namf.

The Session Management Function (SMF) 310 is a network function that is responsible for the allocation and management of IP addresses that are assigned to a UE as well as the selection of a UPF 304 (or a particular instance of a UPF 304) for traffic associated with a particular session of ED 102. The SMF 310 can communicate with other core network functions, in a service based view, through a service based interface denoted as Nsmf. The SMF 310 may also connect to a UPF 304 through a logical interface such as network interface N4.

The Authentication Server Function (AUSF) 312, provides authentication services to other network functions over a service based Nausf interface.

A Network Exposure Function (NEF) 314 can be deployed in the network to allow servers, functions and other entities such as those outside a trusted domain to have exposure to services and capabilities within the network. In one such example, an NEF 314 can act much like a proxy between an application server outside the illustrated network and network functions such as the Policy Control Function (PCF) 316, the SMF 310, the UDM 320, and the AMF 308, so that the external application server can provide information that may be of use in the setup of the parameters associated with a data session. The NEF 314 can communicate with other network functions through a service based Nnef network interface. The NEF 314 may also have an interface to non-3GPP functions.

A Network Repository Function (NRF) 318, provides network service discovery functionality. The NRF 318 may be specific to the Public Land Mobility Network (PLMN) or network operator, with which it is associated. The service discovery functionality can allow network functions and UEs connected to the network to determine where and how to access existing network functions, and may present the service based interface Nnrf.

PCF 316 communicates with other network functions over a service based Npcf interface, and can be used to provide Policy and Charging Control (PCC) functionality to other network functions, including those within the control plane. The PCC functionality may include: a Policy and Charging Rules Function (PCRF); a Policy and Charging Enforcement Function (PCEF); and a Bearer Binding and Event Reporting Function (BBERF).

Implementation of PCC functionality is not necessarily the responsibility of the PCF 316, but rather is typically the responsibility of network functions to which the PCF 316 transmits applicable PCC rules. In one such example the PCF 316 may transmit a PCC rule (associated with a policy)

associated with session management to the SMF 310, which may use the received PCC rule to implement the associated policy. This arrangement may be used to enable a unified policy framework within which network behavior can be governed.

A Unified Data Management Function (UDM) 320 can present a service based Nudm interface to communicate with other network functions, and can provide data storage facilities to other network functions. Unified data storage can allow for a consolidated view of network information that can be used to ensure that the most relevant information can be made available to different network functions from a single resource. This can make implementation of other network functions easier, as they do not need to determine where a particular type of data is stored in the network. The UDM 320 may employ an interface Nudr to connect to a User Data Repository (UDR) 340. The PCF 316 may be associated with the UDM 320 because it may be involved with requesting and providing subscription policy information to the UDR 340, but it should be understood that typically the PCF 316 and the UDM 320 are independent functions.

The PCF 316 may have a direct interface to the UDR 340. The UDM 320 can receive requests to retrieve content stored in the UDR 340, or requests to store content in the UDR 340. The UDM 320 is typically responsible for functionality such as the processing of credentials, location management and subscription management. The UDR 340 may also support any or all of Authentication Credential Processing, User Identification handling, Access Authorization, Registration/Mobility management, subscription management, and Short Message Service (SMS) management. The UDR 340 is typically responsible for storing data provided by the UDM 320. The stored data is typically associated with policy profile information (which may be provided by PCF 316) that governs the access rights to the stored data. In some embodiments, the UDR 340 may store policy data, as well as user subscription data which may include any or all of subscription identifiers, security credentials, access and mobility related subscription data and session related data.

Application Function (AF) 322 represents the non-data plane (also referred to as the non-user plane) functionality of an application deployed within a network operator domain and within a 3GPP compliant network. The AF 322 interacts with other core network functions through a service based Naf interface, and may access network capability exposure information, as well as provide application information for use in decisions such as traffic routing. The AF 322 can also interact with functions such as the PCF 316 to provide application specific input into policy and policy enforcement decisions. It should be understood that in many situations the AF 322 does not provide network services to other NFs, and instead is often viewed as a consumer or user of services provided by other NFs. An application outside the 3GPP network, can perform many of the same functions as AF 322 through the use of NEF 314.

ED 102 communicates with network functions that are in the User Plane (UP) 324, and the Control Plane (CP) 326. The UPF 304 is a part of the CN UP 324 (DN 306 being outside the 5GCN). (R)AN node 302 may be considered as a part of a User Plane, but because it is not strictly a part of the CN, it is not considered to be a part of the CN UP 324. AMF 308, SMF 310, AUSF 312, NEF 314, NRF 318, PCF 316, and UDM 320 are functions that reside within the CN CP 326, and are often referred to as Control Plane Functions. AF 322 may communicate with other functions within CN CP 326 (either directly or indirectly through the NEF 314), but is typically not considered to be a part of the CN CP 326.

Those skilled in the art will appreciate that there may be a plurality of UPFs connected in series between the (R)AN node 302 and the DN 306, and multiple data sessions to different DNs can be accommodated through the use of multiple UPFs in parallel.

User Plane (UP) packets flows to and from a particular ED 102. UP packets are normally routed between the (R)AN node 302 connected to the ED 102, and the DN 306 using General Packet Radio Service (GPRS) Tunneling Protocol for user plane (GTP-U) tunnels 328 and possibly IP-based tunnel 330 established through the N3 and N6 interfaces, respectively. In some examples, connections between (R)AN node 302 and a UPF 304 would make use of GTP-U tunnel 328. Connections between the illustrated UPF 304 and other unillustrated UPFs would also make sure of a GTP-U tunnel. Upon leaving the CN UP, a packet may make use of an IP-based connection between the UPF and the DN 306 instead of a GTP-U tunnel, especially if DN 306 is outside the domain of the operator. Typically, a GTP-U tunnel 328 is established between the (R)AN node 302 and the UPF 304 for each Radio Bearer between the ED 102 and the (R)AN node 302. This allows for a one-to-one relationship between Radio Bearers and GTP-U tunnels. Where there is a second UPF, there would usually be a corresponding GTP-U tunnel between the UPFs for each GTP-U tunnel between the (R)AN node 302 and the UPF 304. This results in each radio bearer being associated with a set of GTP-U tunnels forming a path through the CN UP. Each GTP-U tunnel may support multiple PDU sessions, and packet flows with multiple different QoS requirements. Packet flows within a GTP-U tunnel, such as tunnel 328, having the same QoS requirements may be grouped together as a QoS Flow, which may be identified by a given QFI. The QFI can therefore be used for queuing and prioritization of packet forwarding through the GTP-U tunnels 328 and 330.

At the time of PDU session establishment, the SMF 310 typically provides one or more QoS Profiles to the (R)AN node 302. These QoS Profiles contain QoS parameters for controlling the forwarding of packets having various QoS requirements. Example QoS parameters that may be included in a QoS Profile may include: 5G QoS Identifier (5QI), Allocation and Retention Priority (ARP), Reflective QoS Attribute (RQA), Guaranteed Flow Bit Rate (GFBR), Maximum Flow Bit Rate (MFBR), and Notification Control parameters.

At the time of PDU session establishment, the SMF 310 typically provides one or more QoS Rules to the ED 102. These QoS Rules contain information for controlling the forwarding of packets having various QoS requirements. Example information that may be included in a QoS Rule may include: QoS Rule Identifier (QFI), one or more packet filters and precedence values, and QoS parameters (such as 5G QoS Identifier (5QI), Guaranteed Bit Rate (GBR), Maximum Bit Rate (MBR), etc.). During run-time, the ED 102 may insert the QFI into UpLink (UL) packets prior to sending them through the RB, such as data radio bearer (DRB), to the (R)AN node 302. Upon receipt of the UL packet from the ED 102, the (R)AN node 302 may use the QFI of the packet and the Qos Profiles to control queuing and transmission of the packet to the UPF 304.

As may be appreciated, there can be more than one QoS rule associated with a given QoS Flow. These QoS rules may contain the same QFI. In some cases, a Default QoS rule may be defined. The Default QoS rule may be the only QoS rule of a PDU session that does not contain a packet filter.

In some IP Multimedia Subsystem (IMS) scenarios (and possibly other scenarios not related to IMS), a group of UEs perform communications that are correlated in nature, for example, when two or more UEs communicate with each other directly or via an IMS application (such as a multi-player game application, for example), which may be deployed close to the network edge. In order to route the traffic efficiently, the User Plane (UP) paths of the Protocol Data Unit (PDU) sessions carrying the traffic should be optimized from the end-to-end point of view. In the case of direct UE-to-UE communication, the optimization should take into account location of the involved UEs and other necessary information, such as UP topology and load information (for example how User Plane Functions (UPFs) are interconnected, remaining or available capacity of UPFs and the interconnections between UPFs, etc.). In the case of communication via an IMS application, the UP paths should connect to the same Data Network Access Identifier (DNAI) (which represents the location of the application), and the DNAI should be selected (among a number of given potential DNAIs) according to the location of the involved UEs and other necessary information, such as UP topology, load information, and information (e.g. cost or quality such as throughput, delay performance) of interconnection between UPFs and DNAIs.

Figure 4:
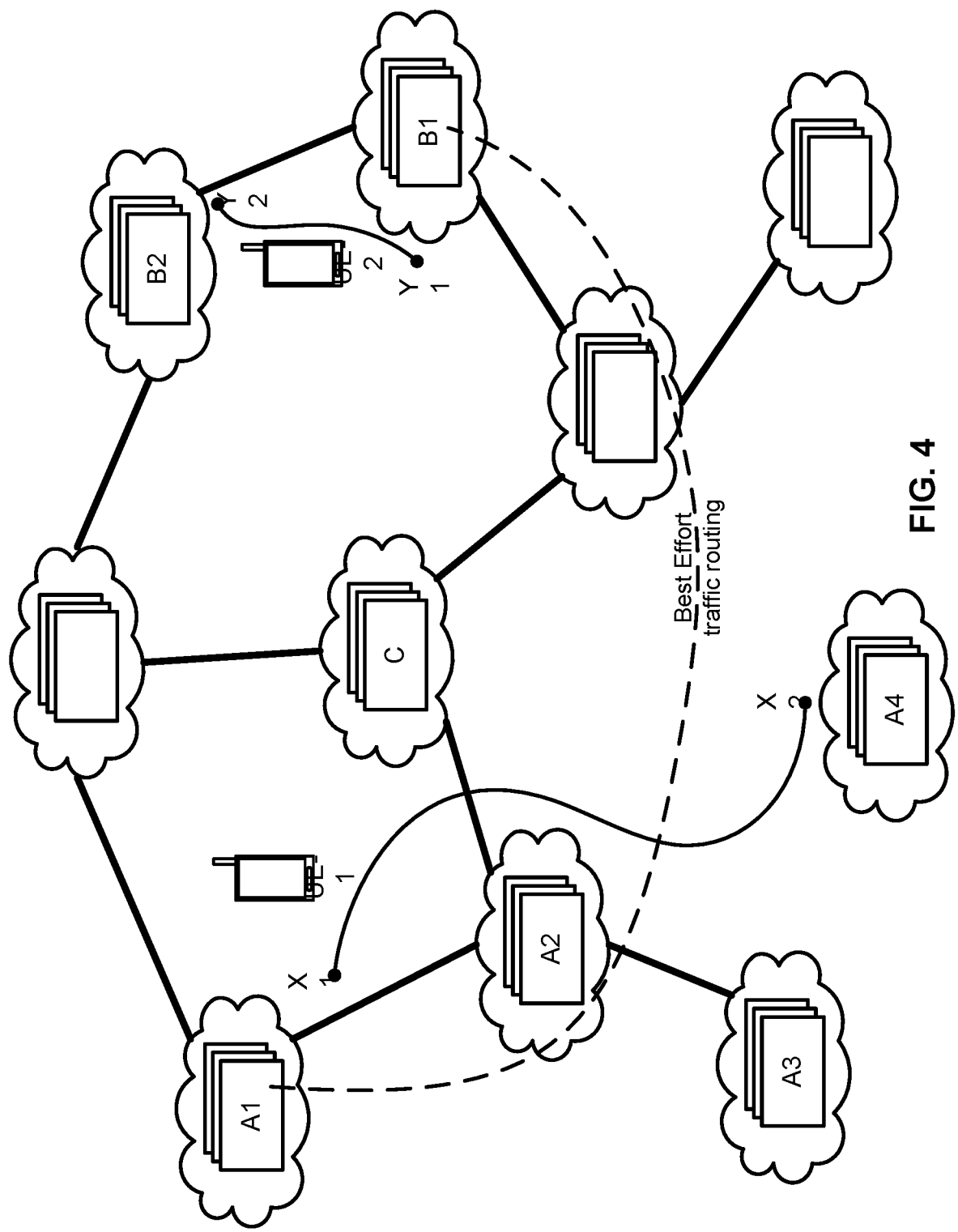
FIG. 4 is a block diagram illustrating an example scenario of independent user plane path management.

Independent UP path management in accordance with conventional methods may have the following weaknesses as illustrated in FIG. 4.

One weakness is that it may lead to poor QoS provisioning because, as soon as the traffic leaves the 5GCN, it may be treated as best effort traffic (e.g. when IMS traffic is delivered directly between UEs without involving IMS media plane). In FIG. 4, the UE-1's UP is anchored at local UPF A1 and the UE-2's UP is anchored at local UPF B1; the traffic between the two UEs is routed as best effort traffic between A1 and B1, without QoS provisioning.

Another weakness of independent UP path management is that it may cause the IMS traffic to be routed into a local DN that does not necessarily have connectivity with other UEs or with the DN that is hosting the application server. In FIG. 4, when the UE-1 is located at position X2, its traffic is routed via local UPF A4 to the local DN, which has no connectivity to the UE-2.

In the presence of UE mobility, it may result in frequent UPF relocation and therefore a large amount of mobility management overhead. In the example of FIG. 4, as UE-1 moves from position X1 to X2, its PSA (PDU session Anchor) relocates frequently from A1, to A2, to A3, and finally to A4.

In general terms, this disclosure presents systems and methods enabling the network to correlate PDU sessions, which may belong to a group of UEs, and to optimize the UP paths jointly for the correlated PDU sessions. With this invention, for example, in the example of FIG. 4, an optimal UPF (e.g. UPF C) can be selected for both UEs' PDU sessions, and the aforementioned problems can be avoided.

In some scenarios, a group of UEs can perform communications that are correlated in nature, for example, when two or more UEs communicate with each other or with an application (e.g. a multiplayer game application). However, in conventional techniques (such as in Release 15 of 3GPP TS23.501, for example) there is a lack of corresponding correlation among the PDU sessions carrying the UE traffic, and the UP paths of these PDU sessions are managed independently from each other. Due to the lack of joint UP path management, it is very likely that the UP paths of these naturally-correlated PDU sessions are not efficient for the traffic from an end-to-end point of view. For example, an inefficient selection of the UPF or DNAI (which represents the location of the application) is likely. This often means undesirably large end-to-end delay and degraded user experience.

This disclosure presents systems and methods for the network to correlate PDU sessions, which may belong to a group of UEs, and to optimize the UP paths jointly for the correlated PDU sessions for end-to-end path efficiency.

In the AF influence feature (described in 3GPP TS 23.501, clause 5.6.7), an AF may send requests to influence SMF routing decisions for traffic of PDU Session. The AF requests may influence UPF (re)selection and allow routing user traffic to a local access to a Data Network (identified by a DNAI). The AF may issue requests on behalf of applications not owned by the PLMN serving the UE. The AF may be in charge of the (re)selection or relocation of the applications within the local DN. Such functionality is not defined. For this purpose, the AF may request to get notified about events related with PDU Sessions.

The AF requests are sent to the PCF via the N5 interface (in the case of requests targeting specific on-going PDU Sessions of individual UE(s), for an AF allowed to interact directly with the 5GC NFs) or via the NEF. The AF requests that target existing or future PDU Sessions of multiple UE(s) or of any UE are sent via the NEF and may target multiple PCF(s), as described in clause 6.3.7.2. The PCF(s) transform(s) the AF requests into policies that apply to PDU Sessions. When the AF has subscribed to UP path management event notifications from SMF(s), such notifications are sent either directly to the AF or via an NEF (without involving the PCF).

The AF request in the AF influence feature (defined in defined in 3GPP TS 23.501, clause 5.6.7) may have any of the following (a non-exhaustive list) information.

The AF request may have information to identify the traffic. The traffic can be identified in the AF request by either a DNN and possibly slicing information (S-NSSAI) or an AF-Service-Identifier. When the AF provides an AF-Service-Identifier i.e. an identifier of the service on behalf of which the AF is issuing the request, the 5G Core maps this identifier into a target DNN and slicing information (S-NSSAI). When the NEF processes the AF request the AF-Service-Identifier may be used to authorize the AF request. The traffic can be identified in the AF request by an application identifier or traffic filtering information (e.g. 5 Tuple). The application identifier refers to an application handling UP traffic and is used by the UPF to detect the traffic of the application When the AF request is for influencing SMF routing decisions, the information is to identify the traffic to be routed. When the AF request is for subscription to notifications about UP path management events, the information is to identify the traffic that the events relate to.

The AF request may have information about the N6 traffic routing requirements for traffic identified as defined above. This is provided implicitly by reference, in the form of a list of routing profile IDs, corresponding each to a DNAI, if the details of the N6 routing requirements are preconfigured in the 5GC. Otherwise, it is provided explicitly by value, in the form of a list of DNAIs and associated N6 traffic routing information. Based on the information about the N6 traffic routing requirements the PCF determines traffic steering policy IDs sent to SMF that each corresponds to a steering behaviour which is preconfigured on the SMF or UPF.

The N6 traffic routing requirements are related to the mechanism enabling traffic steering in the local access to the DN. They are expected to correspond to local rules configured in the UPFs in order to support traffic steering. The routing profile IDs refer to a pre-agreed policy between the AF and the 5GC. This policy may refer to different steering policy ID(s) sent to SMF and e.g. based on time of the day etc.

The AF request may have information on potential locations of applications towards which the traffic routing should apply. The potential location of application is expressed as a list of DNAI(s). If the AF interacts with the PCF via the NEF, the NEF may map the AF-Service-Identifier information to a list of DNAI(s). The DNAI(s) may be used for UPF (re)selection.

The AF request may have information on the UE(s). It may be used to identify the UE(s) or relevant PDU Sessions. This information may correspond to: individual UEs identified using GPSI, or an IP address/Prefix, or a MAC address; groups of UEs identified by an External Group Identifier when the AF interacts via the NEF, or Internal-Group Identifier when the AF interacts directly with the PCF; any UE accessing the combination of DNN, S-NSSAI and DNAI(s).

If the PDU Session type is IPv4 or IPv6 or IPv4v6, when the AF provides an IP address and/or an IP Prefix, this allows the PCF to identify the PDU Session for which this request applies and the AF request applies only to that specific PDU Session of the UE. In this case, additional information such as the UE identity may also be provided to help the PCF to identify the correct PDU Session. Otherwise the request targets multiple UE(s) and shall apply to any existing or future PDU Sessions that match the parameters in the AF request When the AF request targets any UE or a group of UE, the AF request is likely to influence multiple PDU Sessions possibly served by multiple SMFs and PCFs. When the AF request targets a group of UE it provides one or several group identifiers in its request. The group identifiers provided by the AF are mapped to Internal-Group identifiers. Members of the group have this Group Identifier in their subscription. The Internal-Group Identifier is stored in UDM, retrieved by SMF from UDM and passed by SMF to PCF at PDU Session set-up. The PCF can then map the AF requests with user subscription and determine whether an AF request targeting a Group of users applies to a PDU Session.

When the AF request is for influencing SMF routing decisions, the information is to identify UE(s) whose traffic is to be routed. When the AF request is for subscription to notifications about UP path management events, the information is to identify UE(s) whose traffic the events relate to.

The AF request may have indication of application relocation possibility. This indicates whether an application can be relocated once a location of the application is selected by the 5GC. If application relocation is not possible, the 5GC shall ensure that for the traffic related with an application, no DNAI change takes place once selected for this application.

The AF request may have type of notifications regarding UP path management events. The AF subscription can be for early notification and/or late notification. In the case of a subscription for early notification, the SMF sends the notification before the UP path is configured. In the case of a subscription for late notification, the SMF sends the notification after the UP path is configured.

The AF request may have an AF transaction identifier referring to the AF request. This allows the AF to update or remove the AF request and to identify corresponding UP path management event notifications when the notifications include the AF transaction identifier. The AF transaction identifier is generated by the AF.

For PDU Session that corresponds to the AF request, the PCF provides the SMF with PCC rules that are generated based on the AF request and taking into account UE location presence in area of interest (i.e. Presence Reporting Area). The PCC rules may contain the AF transaction internal identifier, information to identify the traffic and/or information about the DNAI(s) towards which the traffic routing should apply and/or indication of application relocation possibility and/or a list of traffic steering policy IDs and/or information on AF subscription to SMF events (type of notifications). If the N6 routing information associated to the application is explicitly provided in the AF request, the PCF also provides the N6 routing information to the SMF as part of PCC rules. This is done by providing policies at PDU Session set-up or by initiating a PDU Session Modification procedure. When initiating a PDU Session set-up or PDU Session Modification procedure, the PCF considers the latest known UE location to determine the PCC rules provided to the SMF.

When the PCC rules are activated, the SMF may, based on local policies, take the information in the PCC rules into account to (re)select UPF(s) for PDU Sessions. The SMF is responsible for handling the mapping between the UE location (TAI/Cell-Id) and DNAI(s) associated with UPF and applications and of the selection of the UPF(s) that serve a PDU Session. This is described in clause 6.3.3.

When the PCC rules are activated, the SMF may, based on local policies, take the information in the PCC rules into account to activate mechanisms for traffic multi-homing or enforcement of an UL Classifier (UL CL). Such mechanisms are defined in clause 5.6.4. This may include providing the UPF with traffic forwarding (e.g. break-out) rules and the associated N6 routing information if the N6 routing information is part of the PCC rules. In the case of UP path reselection, the SMF may configure the source UPF to forward traffic to the UL CL/BP so that the traffic is steered towards the target UPF.

When the PCC rules are activated, the SMF may, based on local policies, take the information in the PCC rules into account to inform the AF of the (re)selection of the UP path (change of DNAI).

In some embodiments, the AF influence (described in 3GPP TS 23.501, clause 5.6.7 and summarized above) may be enhanced by allowing the AF to indicate additional information in the AF request sent to the PCF for influencing traffic routing. as discussed herein. For example, in addition to the information elements described in 3GPP TS23.501, clause 5.6.7, the AF request, according to embodiments of the disclosure may also include one or more fields containing information indicating any one or more of: PDU session correlation, correlation type, and correlation purpose in the AF request. In some embodiments, these indications may be included in a single field.

The PDU session correlation indication implies that the PDU sessions identified in the AF request (e.g. by any of UE IP address, UE identifier, UE group identifier, DNN, S-NSSAI) are correlated. This means the UP paths of these PDU sessions should be jointly (re)selected for the traffic identified in the AF request (e.g. by an application ID or a traffic filter).

The correlation type indicates whether joint DNAI (re)selection or joint UPF (re)selection is requested or desired for the joint UP path (re)selection.

As noted above, the DNAI represents the location of the application. Accordingly, DNAI (re)selection implies (re)

selection of the location of the application. Joint DNAI (i.e. application location) (re)selection implies that the DNAI (re)selection decision for the correlated PDU sessions should be made jointly, such as by selecting a common DNAI, for the traffic identified in the AF request. This may allow the UP paths of the correlated PDU sessions to be bridged for the traffic via the jointly (re)selected DNAI(s).

Joint UPF (re)selection implies the UPF selection decision for the correlated PDU sessions should be made jointly, such as by selecting a common UPF as the PDU session Anchor for the traffic identified in the AF request. This allows the UP paths of the correlated PDU sessions to be bridged for the traffic via the jointly (re)selected UPF(s). For example, the UP paths of correlated PDU sessions may be connected through direct connections between the jointly selected UPF(s) (in some cases, a UPF can be considered connected to itself via a virtual connection) or through jointly selected common UPF(s).

The directly connected UPF(s) can be viewed as virtual DNAIs to each other, and the direct connection between them may be N6 connections. Alternatively, the direct connection between the jointly selected UPF(s) can be viewed as virtual DNAIs.

Correlation type may also be referred to as UP bridge type. Joint DNAI (re)selection as a correlation type may be referred to as DN-based or application-based UP bridge; joint UPF (re)selection as a correlation type may be referred to as UPF-based UP bridge. The two correlation types are illustrated in FIGS. 5A and 5B.

Figure 5A:
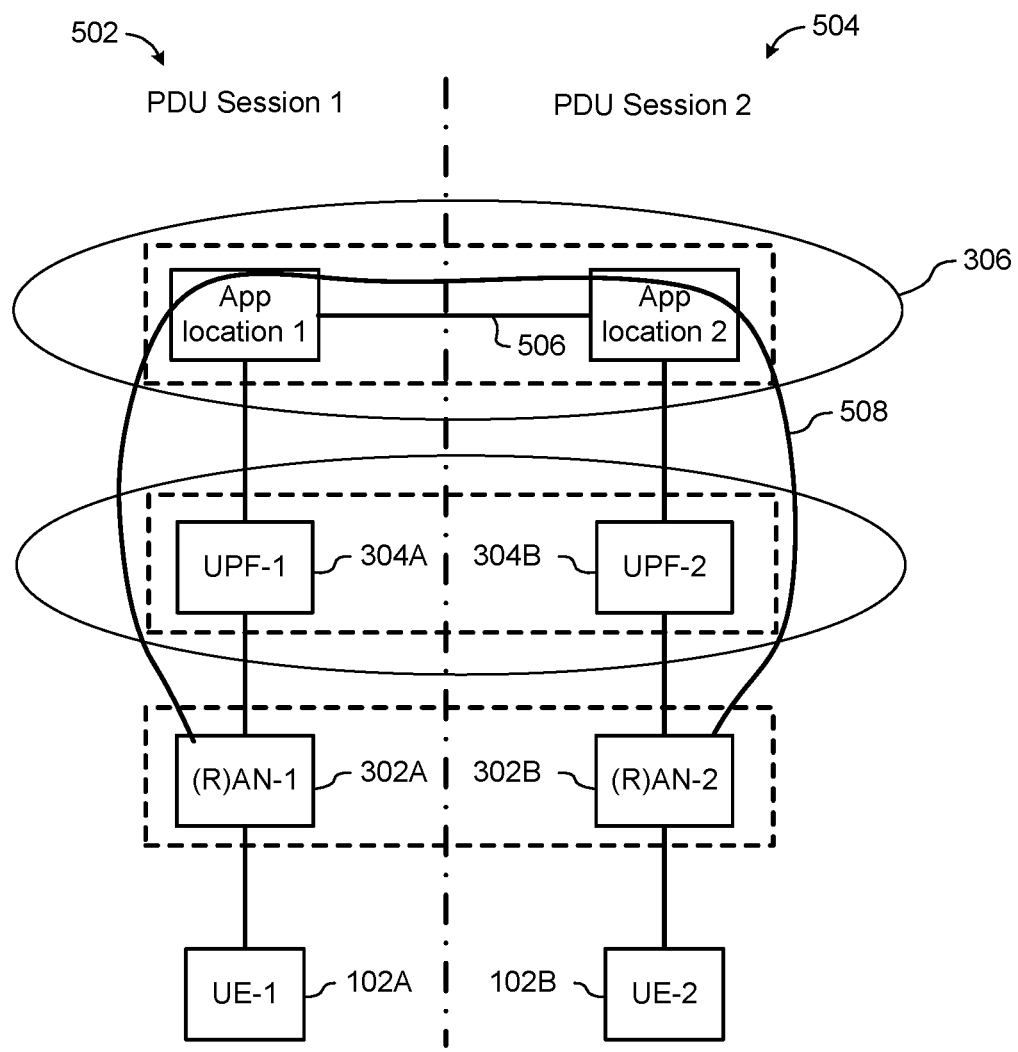
FIGS. 5A and 5B are block diagrams illustrating respective scenarios of joint user plane path management for correlated PDU sessions in the system architecture of FIG. 3.

FIG. 5A illustrates an example of a DN-based UP bridge, in which two PDU sessions 502, 504 are correlated by a joint DNAI, and are associated with respective UP paths that are joined together via a link 506 (which may be either a physical link or a virtual link) in the DN 306 to define an end-to end path 508.

Figure 5B:
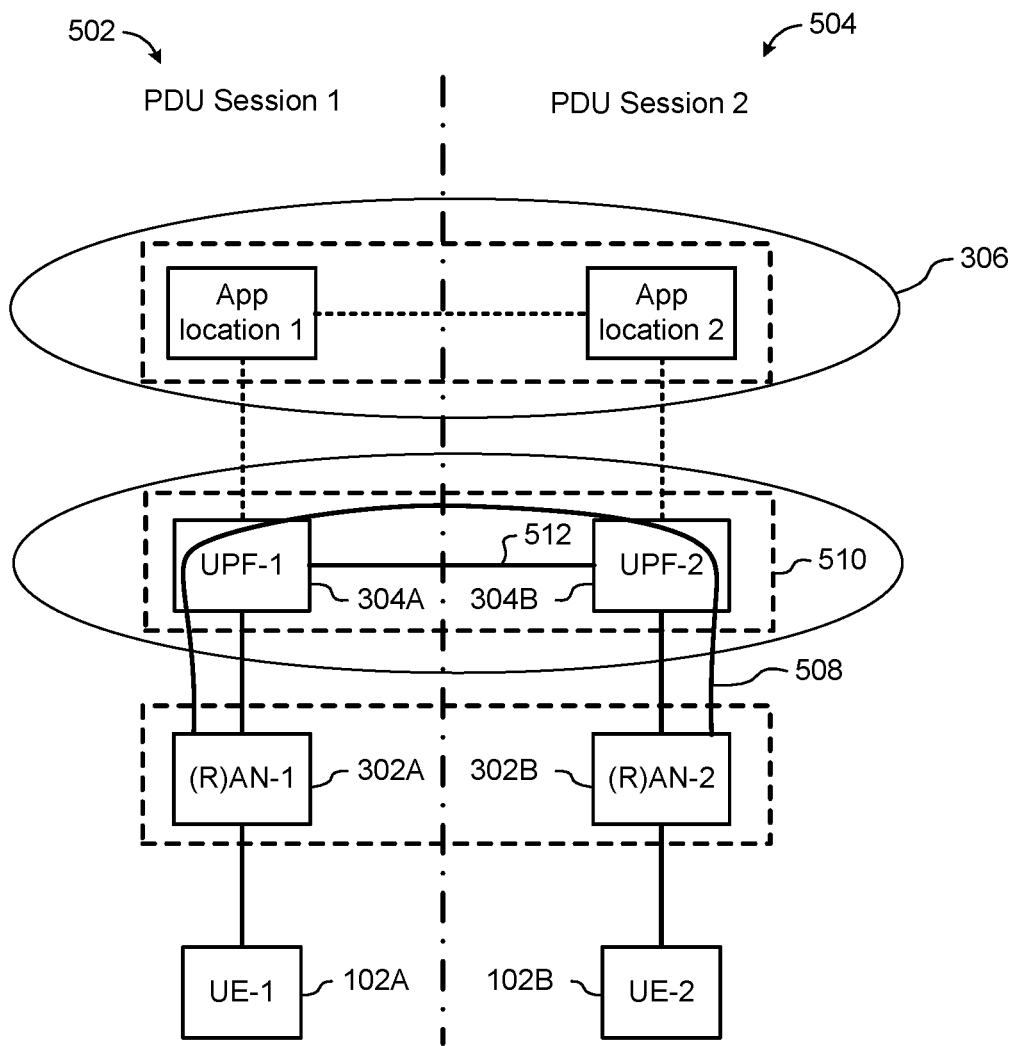

FIG. 5B illustrates an example of a UPF-based UP bridge, in which two PDU sessions 502, 504 are correlated by a joint UPF 510, and are associated with respective UP paths that are joined together via a link 512 (which may be either a physical link or a virtual link) in the joint UPF 510 to define an end-to end path 508.

In some embodiments, the joint UPF 510 may also operate as an anchor UPF for the involved PDU sessions. As is known in the art, an anchor UPF (which may also be referred to as PDU session anchor) for a PDU Session is a UPF that connects the UP path associated with the PDU session to the DN 306 or an access point of the DN identified by a DNAI. This UPF implements the N6 connection 330 with the DN 306.

The purpose of a correlation (i.e. correlation purpose) may be for multicasting, anycasting or unicasting. The traffic filtering information in the AF or implied by the AF request (e.g. mapped by or from the application identifier in the AF request) should match the correlation purpose. That is, for multicasting or anycasting, the traffic filter information should be described, for example, using a multicasting or anycasting address or identifier allocated to the group of UEs, whereas for unicasting, it should be described, for example, using a unicasting address or identifier allocated to each of the group of UEs.

Multicasting or anycasting address or identifier can be allocated by the 5GCN for a group of UEs. The AF may request to establish a UE group. Such a request may be validated by the NEF and then forwarded to the UDM or UDR, where a UE group is established or UE group context is maintained according to the information in the AF request (e.g. group membership information—which UEs are in the group). The UDM or UDR may allocate a multicasting address or identifier and/or an anycasting address or identifier for the group and returns the address(es) or identifier(s) to the AF via the NEF as a response to the request. Alternatively, the NEF may allocate a multicasting address or identifier and/or an anycasting address or identifier for the group and provide the address(s) or identifier(s) to the AF when the NEF responds to the AF for the request; the NEF then stores the address(es) or identifier(s) and the association between the address(es) or identifier(s) and the UE group into the UDM or UDR. The AF provides the multicasting address or identifier and/or the anycasting address or identifier to the UEs, each of which then uses the address(es) or identifier(s) for multicasting or anycasting communication to the group.

Two alternative approaches are presented to jointly optimize the UP paths of correlated PDU sessions. In one approach, the path selection functionality of the SMF is split into a separate function, which may be referred to as a Path Selection Function (PSF). The PSF can serve multiple SMFs and therefore perform UP path (re)selection jointly for the correlated PDU sessions that are served by those SMFs, e.g. by selecting a common UPF and/or a common DNAI for the PDU sessions. The PSF functionality may be offered or implemented by an existing Control Plane (CP) function, e.g. PCF, NEF, NRF, UDM, UDR, NWDAF, AMF, NSSF, or by a special type of SMF, e.g. a master SMF, or by an independent function. When it is integrated within another CP function, the interaction between the PSF and that CP function described in this description becomes an internal process of that CP function.

In the other approach, two levels of UP path (re)selection may be applied. At the higher level, a UP Optimizer (UPO) function jointly (re)selects DNAIs (including virtual DNAIs when the correlation type (or UP bridge type) indicates Joint UPF (re)selection or UPF-based UP bridging) for the correlated PDU sessions). At the lower level, the serving SMF of each of these correlated PDU sessions (re)selects UP paths independently for the PDU session according to the DNAI selected by the UPO for the PDU session. The UPO functionality may be offered by an existing CP function, e.g. PCF, NEF, NRF, UDM, UDR, NWDAF, AMF, or by a special type of SMF, e.g. a master SMF, or by an independent function. When it is integrated within another CP function, the interaction between the UPO and that CP function described in this invention becomes internal process of that CP function.

In either of the two approaches, for a PDU session, the traffic steering or routing behavior at the UPF (in the PDU session's UP path) connecting to the UP path of a correlated PDU session (via DNAI or directly) may be configured to support the correlation purpose, i.e. multicasting, anycasting or unicasting. The configuration may be performed by the PSF or the UPO directly, or via the SMF serving the PDU session. In order for the PSF to perform the configuration, the PSF needs to know the correlation purpose, which may be provided by the SMF according to the PCC rules that are received from the PCF and are generated based on information associated with the AF request. In order for the UPO to perform the configuration, the UPO needs to know the correlation purpose, which may be provided by the PCF or the NEF according to the information associated to the AF request that the PCF or the NEF received from the AF.

When configuring the traffic steering or routing behavior, the SMF or the PSF or the UPO may provide a traffic steering or routing policy ID to the UPF, which maps to detailed traffic steering or routing information preconfigured in the UPF. Alternatively, the SMF or the PSF or the UPO may configure the detailed traffic steering or routing information into the UPF directly. N6 traffic steering or routing information is one type of traffic steering or routing information. The traffic steering or routing information may include protocol parameters to be used for the traffic steering and routing.

In multicasting, when a UE transmits a message, all of the other UEs in the group receive the message. To enable multicasting, the N6 traffic steering or routing information in the UPF may specify the multicasting behavior (e.g. through multiple simultaneous unicasting operations, each toward a DNAI connected to the UPF (the DNAI may be a virtual DNAI representing or equivalent to a different or the same UPF or an inter-UPF connection incident to the UPF, as described elsewhere (for UPF-based bridging)). In anycasting, when a UE transmits a message, any (one or a few) of the other UEs in the group receives the message, and which one or a few is determined by the network. To enable anycasting, the N6 traffic steering or routing information in the UPF may specify the anycasting behavior (e.g. through unicasting operation(s) toward one or a few randomly selected DNAI(s) connected to the UPF (the DNAI may be a virtual DNAI representing/equivalent to a different or the same UPF or an inter-UPF connection incident to the UPF, as described elsewhere (for UPF-based bridging)), or the selection may be based on load, such as least loaded DNAI(s) or least loaded UPF-DNAI interconnect, if such load info is available.

Figure 6:
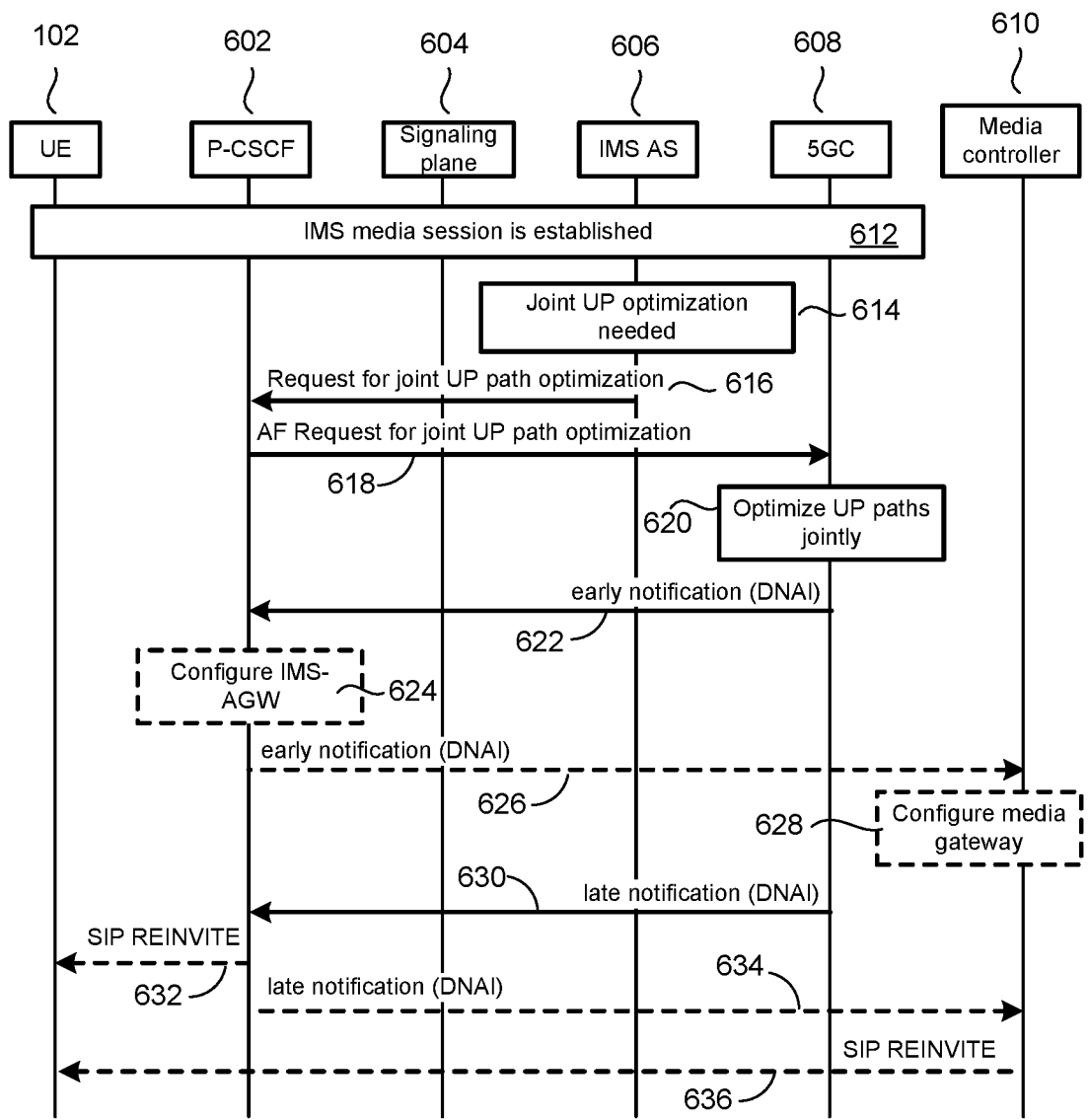
FIG. 6 is a message flow diagram illustrating an example procedure for optimizing UP paths in the system architecture of FIG. 3.

FIG. 6 illustrates an example procedure of optimizing UP paths between two or more UEs 102 for IMS using the systems and methods presented herein. It is assumed that that an IMS AS 606 (e.g. an AR/VR application) determines 614 the need of joint UP path optimization for two or more UEs 102 for IMS traffic and initiates the optimization. In some embodiments, other network functions (e.g. a P-CSCF 602, an S-CSCF, MGCF, BGCF, etc.) may replace the IMS AS 606 to make the determination and initiates the optimisation.

Referring to FIG. 6, after IMS media sessions are established 612 for a group of UEs 102 (two or more UEs 102), the IMS Application Server (IMS-AS) 606 decides to initiate joint UP path optimization for the group of UEs 102. The UEs 102 may be served by different P-CSCFs 602.

The IMS-AS 606 sends 616 a request to a selected P-CSCF 602 for joint UP path optimization for the group of UEs 102. The selected P-CSCF 602 is one of the serving P-CSCF 602 of the group of UEs 102.

The request may include identity information of the UEs 102 and information identifying the IMS traffic. It may also include an indication that indicates correlation of the IMS traffic for joint UP path optimization and the type of correlation (i.e. joint UPF (re)selection, or joint DNAI (re)selection) and the purpose of correlation (i.e. multicasting, anycasting, unicasting).

The P-CSCF 602 acts as an AF 322 and creates an AF request for joint UP path optimization based on the information received. The AF request includes the correlation indication, the correlation type and the correlation purpose that are indicated in the received 616 request. The AF request includes a list of DNAIs if the correlation type indicates joint DNAI (re)selection. The P-CSCF sends 618 the AF request to the 5GCN 608, which then jointly reselects 620 UP paths (as will be described in greater detail below with reference to FIGS. 8 and 12A-B) accordingly for the PDU sessions (or PDU Sessions of UEs 102) identified in the AF request and for the traffic identified in the AF request.

If the correlation type in the AF request sent 618 from the P-CSCF 602 to the 5GCN 608 implies joint UPF selection, the 5G Core network (5GCN) 608 may configure UPF(s) to route the IMS traffic identified in the AF request between UP paths of these PDU sessions without involving any actual DNAI (as may be seen in FIG. 5B).

If the correlation type in the AF request sent 618 from the P-CSCF 602 to the 5GCN 608 implies joint DNAI selection, the 5GCN 608 may configure UPF(s) to route IMS traffic identified in the AF request to the selected DNAI(s) (as may be seen in FIG. 5A).

The following steps may be optional if the correlation type in the AF request 618 indicates joint UPF selection.

The Proxy Call Session Control Function (P-CSCF) 602 receives 622 from the 5GCN 608 an early notification of UP path management event for one of the UEs 102 within the UE group, if the AF request 618 includes subscription to such notifications. The notification includes selected DNAI and UE 102 identity information.

The P-CSCF 602 takes proper action upon receipt of the early notification. If the UE 102 identified in the notification is being served by the P-CSCF 602, the P-CSCF 602 identifies the IMS-AGW using the DNAI information in the notification and, if the identified IMS-AGW is different from the one currently being used for the UE 102, configures 624 the IMS-AGW for the UE 102.

Otherwise, the P-CSCF 602 forwards 626 via a signaling plane 604, e.g. the IMS signaling/control plane, the early notification to the serving media controller of the UE 102, which identifies the media gateway using the DNAI information in the notification and, if the identified media gateway is different from the one currently being used for the UE 102, configures 628 the media gateway for the UE 102. The media controller and the media gateway may respectively be a SIP server/CSCF such as P-CSCF 602 and an IMS media plane function such as IMS-AGW when the UE 102 is within the IMS domain, or counterpart Circuit Switch (CS) network functions when the UE 102 is within the CS domain, e.g. a Media Gateway Control Function (MGCF) which manages/controls a Media Gateway (MGW), which handles/processes media traffic in a Public Switched Telephone Network (PSTN).

The P-CSCF 602 receives 630 from the 5GCN 608 a late notification of UP path management event for one of the group of UEs 102, if the AF request 618 includes subscription to such notifications. The notification may include selected DNAI and UE 102 identity information. The P-CSCF 602 takes proper action upon receipt of the late notification.

If the UE 102 identified in the notification is being served by the P-CSCF 602 and if a new IMS-AGW has been configured 624 for the UE 102, the P-CSCF 602 transmits 632 a SIP REINVITE message toward the UE 102.

If the UE 102 identified in the notification is not being served by the P-CSCF 602, the P-CSCF 602 forwards 634 via a signaling plane 604, e.g. the IMS signaling/control plane, the late notification to the serving media controller of the UE 102. If a new media gateway has been configured 628 for the UE, the serving media controller of the UE 102 transmits 636 a SIP REINVITE message toward the UE 102.

In an embodiment, the path selection functionality of the SMF is split into a separate function, namely a Path Selection Function (PSF). The PSF can serve multiple SMFs and therefore perform UP path (re)selection jointly for the correlated PDU sessions that are served by those SMFs, for example by selecting a common UPF and/or a common DNAI for the PDU sessions according to the correlation type. The PSF functionality may be offered by an existing CP function, e.g. PCF, NEF, NRF, UDM, UDR, AMF, NWDAF, NSSF, or by a special type of SMF, e.g. a master SMF, or by an independent function.

Figure 7:
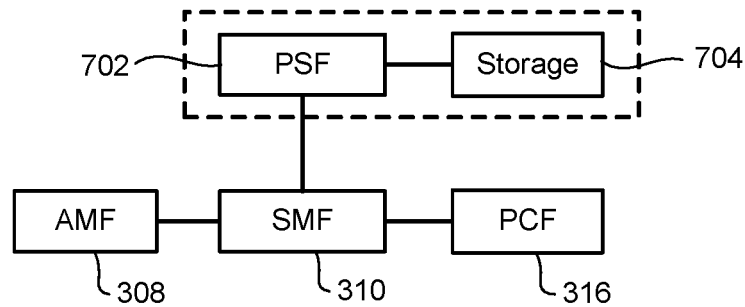
FIG. 7 is a block diagram illustrating an example architecture for path selection functionality in the system architecture of FIG. 3.

FIG. 7 illustrates an example architecture in which the path selection functionality of the SMF 310 is split into a separate function, namely a Path Selection Function (PSF) 702. There may be a single logical PSF 702 per network slice or per DN per network slice or per PLMN. The PSF 702 may be configured (e.g. by the OAM) to be associated with a storage function 704. In some embodiments, the use of the storage function 704 allows the PSF 702 to be a stateless function that may have multiple physical instances (e.g. for tolerating failure and for balancing computing load), which can allow the multiple physical instances to make consistent decisions as their decision is based on the same data stored in the storage function 704. In some embodiments, the PSF 702 may maintain a local cache of data stored by the storage function 704, in order to reduce the frequency at which the PSF 702 must retrieve data from the storage function 704. In some embodiments, the PSF 702 may subscribe to the storage function 704 for updated data pertaining to one or more specified PDU sessions, for example, when the storage function 704 receives new (or updated) data pertaining to the specified PDU sessions, the storage function 704 can send the updated data to the PSF 702 and thereby synchronise the data stored by the storage function 704 with the local cache maintained by the PSF 702.

The SMF 310 may select the PSF 702 using DN information (e.g. DNN), slice information (e.g. S-NSSAI) and/or local configuration (e.g. locally configured PSF information such as an identifier). The SMF 310 may provide any of these parameters to the NRF, and the NRF may return information of a corresponding PSF 702 (e.g. a network address). The PSF 702 selection may also be pre-configured in the SMF 310, e.g. by the Operation, Administration and Maintenance (OAM) system. For example, the network address of the selected PSF 702 can be preconfigured in the SMF 310.

The SMF 310 may subscribe to receive notifications of UP path (re)selection (including DNAI (re)selection) from the PSF 702 for PDU sessions targeting the network slice (or the network slice and the DNN). These notifications may include UP path (re)selection decision, and the SMF 310 may implement the decision by (re)configuring the UP path and N6 traffic routing at relevant UPFs.

In the example of FIG. 7, the PSF 702 is associated with a storage function. The storage function 704 may be a separate CP function, e.g. UDM, UDR, USDSF, NRF, NWDAF, NEF, etc., or an internal function of the PSF 702. The PSF 702 may use the storage function 704 to store context information of the SMF subscription. When the SMF 310 unsubscribes from the PSF 702, the PSF 702 removes the subscription context from the storage function 704. In addition to the SMF subscription context, the storage function 704 may store UP information necessary for making UP path (re)selection decisions. The PSF 702 (re)selects UP paths for PDU sessions based on the SMF subscription information and the UP information in the storage function 704.

The PSF 702 jointly optimizes the UP paths of correlated PDU Sessions. Because a PDU Session may be used to access multiple applications, the joint optimization may impact only a branch of the UP path of the PDU Session, i.e. the branch connecting to the application for which the correlation is specified for. This may be reflected by insertion, removal or relocation of UL CL/Branching Point and additional PSA 702 in the UP path.

When a PDU session is involved in two (or more) separate correlations, one correlation should not impact the UP path efficiency of the PDU session in the other correlation(s). This can be achieved by having two UP path branches in the UP path of the PDU session, one for each correlation, and optimizing the two branches separately for the two corresponding correlations.

The UP information stored in the storage function 704 associated to the PSF 702 may include UP topology information and analytical information related to UP. UP topology information may include information about UPF interconnection and associate properties (such as throughput capacity, delay performance, and cost), and UPF properties (such as IP address, location, processing capacity). UP-related analytical information may indicate statistical load and/or cost of UPFs and statistical load of interconnections between UPFs at a per-slice level or at a per-DN-per-slice level.

The UP information may be provided by an information provider, for example, the OAM or the Network Data Analytics Function (NWDAF), and it may be stored into the storage function 704 via the PSF 702. That is, the PSF 702 may receive the information from the provider(s) and then send it to the storage function 704 for storage or update. Alternatively, the information may be provided by the provider(s) directly to the storage function 704 for storage or update.

In some embodiments, the PSF 702 obtains UP-related analytical information from the NWDAF. The PSF 702 may send a request to the NWDAF for subscription to notifications of such information or update/change of such information. The subscription request may include notification criteria, i.e. under what conditions a change in UP-related analytical information should be updated or notified to the PSF 702. The conditions or criteria may include a periodic timer value (for periodic report upon timer expiry), and/or a threshold value (for event based reporting when the remaining/available capacity is below or loading exceeds the given threshold value). The NWDAF may respond to the PSF 702 to acknowledge reception of the request. The response may include UP-related analytical information that the PSF 702 subscribed to. The NWDAF may notify the PSF 702 of the UP-related analytical information or UP-related analytical information changes. For the subscription request from the PSF 702, the first notification may replace the response in order to save messages (i.e. the notification serves as the response). The notification may happen periodically when UP-related analytical information changes, e.g. when the notification criteria specified in the subscription request or in local configuration are met.

Figure 8:
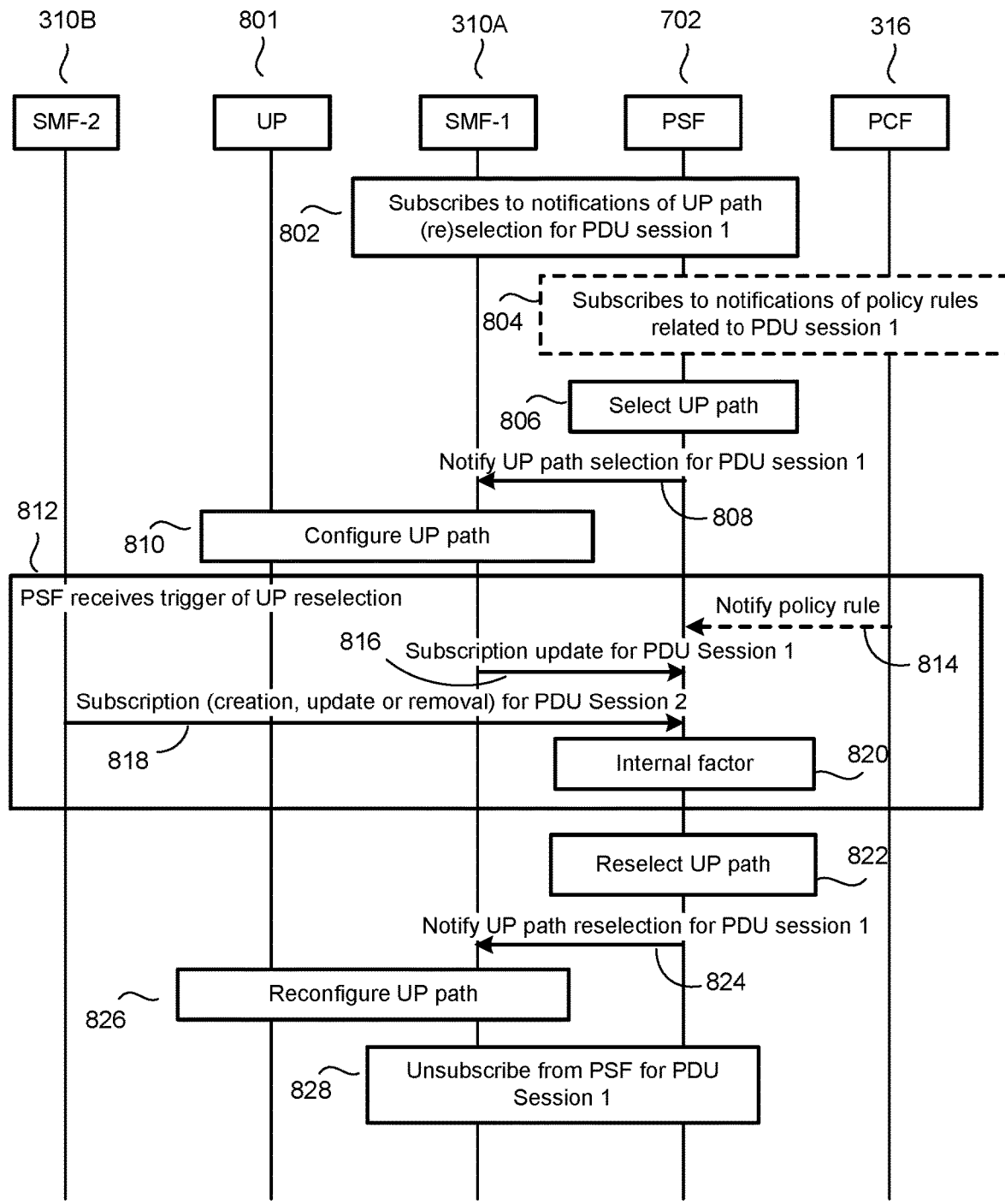
FIG. 8 is a message flow diagram illustrating an example procedure for UP path (re)selection by the PSF of FIG. 7.

FIG. 8 illustrates an example procedure of UP path (re)selection by the PSF 702. Referring to FIG. 8. the SMF 310 (or 310A) subscribes 802 to receive notifications of UP path (re)selection (including DNAI (re)selection) decisions for a PDU session (i.e. PDU Session 1) for some traffic. The information provided by the SMF 310A to the PSF 702 is stored by the PSF 702 as subscription context.

This step may be triggered or happen when the SMF 310A receives the PDU session establishment request from the UE 102 or the path switch request from AMF 308 or when the SMF 310A decides to activate the PDU session, e.g. due to UE 102 service request, or modifies the PDU session, e.g. due to policy change. In this step, the SMF 310A may provide the UE 102 mobility information (e.g. current serving RAN node ID) to the PSF 702. Alternatively, the PSF 702 may subscribe to receive UE mobility information from the AMF 308, upon the SMF subscription. This alternative is not shown in FIG. 8.

In this step, the SMF 310A may provide information associated to PCC rules obtained from the PCF 316, e.g. correlation ID, correlation type, correlation purpose in the policy rules generated based on AF request (details described in the next figure) and relevant to the PDU session.

The PSF subscribes 804 to receive PCC rules related to UP path selection for the PDU Session 1 from the PCF 316. According to the subscription, the PCF 316 notifies the PSF 702 of relevant PCC rule change or update. These PCC rules may be rules that indicates joint UP optimization for multiple correlated PDU sessions (or group of UEs). They may be generated or updated by the PCF 316 based on the AF request in the conventional AF influence feature (as descried in 3GPP TS23.501, clause 5.6.7) or in the enhanced AF influence feature described herein (e.g. in the next figure).

The PSF 702 sends a request to the PCF for the subscription. The request may include information received 802 from the SMF 310A, e.g. any of DNN, S-NSSAI, UE identity information (e.g. GPSI, SUPI), UE IP address, UE group information (e.g. Internal Group ID). The PSF 702 may select the PCF 316 for the subscription based on any of DNN, S-NSSAI, UE identity information (e.g. GPSI, SUPI), UE IP address, UE group information (e.g. Internal Group ID). Alternatively, if in 802, the SMF 310A indicates the PCF information (e.g. ID of the PCF 316 or network address of the PCF 316) to the PSF 702 during the subscription process, the PSF 702 can identify the PCF 316 using that information.

The PCF 316 may respond to the PSF 702 to acknowledge receipt of the request. The response may include the PCC rules that the PSF 702 is subscribing to. The PCF 316 notifies the PSF 702 of the PCC rules related to the PDU session or change in those PCC rules. For the subscription request, the first notification may replace the response in order to save message (i.e. the notification serves as the response). This step may happen periodically when PCC rules change, e.g. when the AF updates the AF request, resulting in change in the PCC rules generated based on the AF request.

This step is optional if the necessary information in the PCC rules needed by the PSF 702 are provided by the SMF 310A to the PSF 702 as part of subscription context, or if the PCC rules or the necessary information in the PCC rules are preconfigured (e.g. by the OAM) in the PSF 702 or the subscription has been performed (e.g. due to another PDU session).

The PSF 702 selects 806 UP path for the PDU session according to the subscription context (which is described elsewhere herein), UE mobility information (which may be part of the subscription context received from the SMF 310A or received from the AMF 308 separately), UP information (e.g. UPF topology information, UP-related analytical information, described elsewhere herein), local configuration, and PCC rules received from the PCF 316 (if selection 806 of UP path is executed).

When the PDU session is correlated with other PDU sessions (e.g. as indicated by the correlation ID in the policy information passed 802 by the SMF 310A or PCC rules received 802 from the PCF 316), the PSF 702 identifies the correlated PDU sessions using the correlation ID in the corresponding subscription context (e.g. other information in the subscription context may also be used, such as DNN, S-NSSAI, UE group information, UE identify information) and performs UP path (re)selection jointly for this PDU session and the PDU sessions correlated to it.

The PSF 702 notifies 808 the SMF 310A of the UP path selection decision including DNAI selection decision for the PDU Session 1. In this step, the PSF 702 may provide the SMF 310A with the traffic steering information to be configured in the UPF, e.g. to support multicasting, anycasting, unicasting as described elsewhere herein. The notification includes the PDU Session ID of PDU Session 1.

The SMF 310A configures 810 the UP path 801 according to the UP path selection decision and the information received 808. It should be noted that the UP 801 may include the UPF 304, the N3 connections (at both ends: RAN 302 and UPF 304) and the N6 connection end corresponding to the UPF 304 end only. The SMF 310A sends early notification(s) to the AF before the UP path is configured if PCC rules received from PCF 316 indicate AF subscription to such early notification(s), as described in 3GPP TS23.501, clause 5.6.7. In other embodiments the SMF 310A sends late notification(s) to the AF after the UP path is configured if PCC rules received from PCF 316 indicate AF subscription to such late notification(s).

The PSF 702 receives 812 triggers (816, 818, 820, 820) for UP path reselection for the PDU Session 1. One trigger is the receiving 814 updated PCC rules from the PCF 316, as a result of the subscription 804.

Another trigger is an update to the subscription 802 (e.g. UE mobility information change (e.g. change of serving RAN node, which may be notified by the AMF 308 to the SMF 310A), correlation information change (which may be notified by the PCF 316 to the SMF 310A, as a result AF request update from the AF)), received 816 from the SMF-1 310A. Possible correlation information changes include addition/removal/modification of correlation ID, change of correlation type, change of correlation purpose.

This may be performed by the SMF-1 310A when the SMF-1 310A receives updated PCC rules from the PCF 316 or update UE mobility information from the AMF 308.

Another trigger for UP path (re)selection is a subscription to UP path (re)selection decision is created, modified or deleted as requested 818 by the SMF-2 310B for the PDU session 2 that is correlated to the PDU session 1.

Other triggers include other factors, e.g. dynamic road report received from the UPF, change in UP-related analytical information.

The PSF 702 reselects 822 the UP path for the PDU session 1 according to the trigger(s) (e.g. the information carried in the trigger(s)). If the PDU session 1 and the PDU session 2 are correlated, the UP path reselection decision takes into account the PDU session 2. The behavior 822 of the PSF 702 in this step may be the same as or similar to that earlier in selecting 806 UP path.

The PSF 702 notifies 824 the SMF 310A of the UP path reselection decision for PDU Session 1, which may include DNAI reselection. In this step, the PSF 702 may provide the SMF 310A with the traffic steering information to be configured or updated in the UPF, e.g. to support multicasting, anycasting, unicasting as described elsewhere herein. The notification includes the identifier of PDU Session 1.

The SMF 310A reconfigures 826 the UP path 801 according to the UP path reselection decision and the information received 824. The SMF 310A sends early (or late) notification(s) to the AF before (or after) the UP path is reconfigured if PCC rules received from PCF 316 indicate AF subscription to such notification(s), as described in 3GPP TS23.501, clause 5.6.7.

The SMF 310A unsubscribes 828 from the PSF 702 for the PDU session 1 when the PDU session 1 is released or when the UP connection (e.g. N3 connection) of the PDU session 1 is deactivated. This unsubscription 828 may trigger the PSF to perform UP path reselection for the PDU session 2 if the PDU session 2 is correlated to the PDU session 1.

Figure 9:
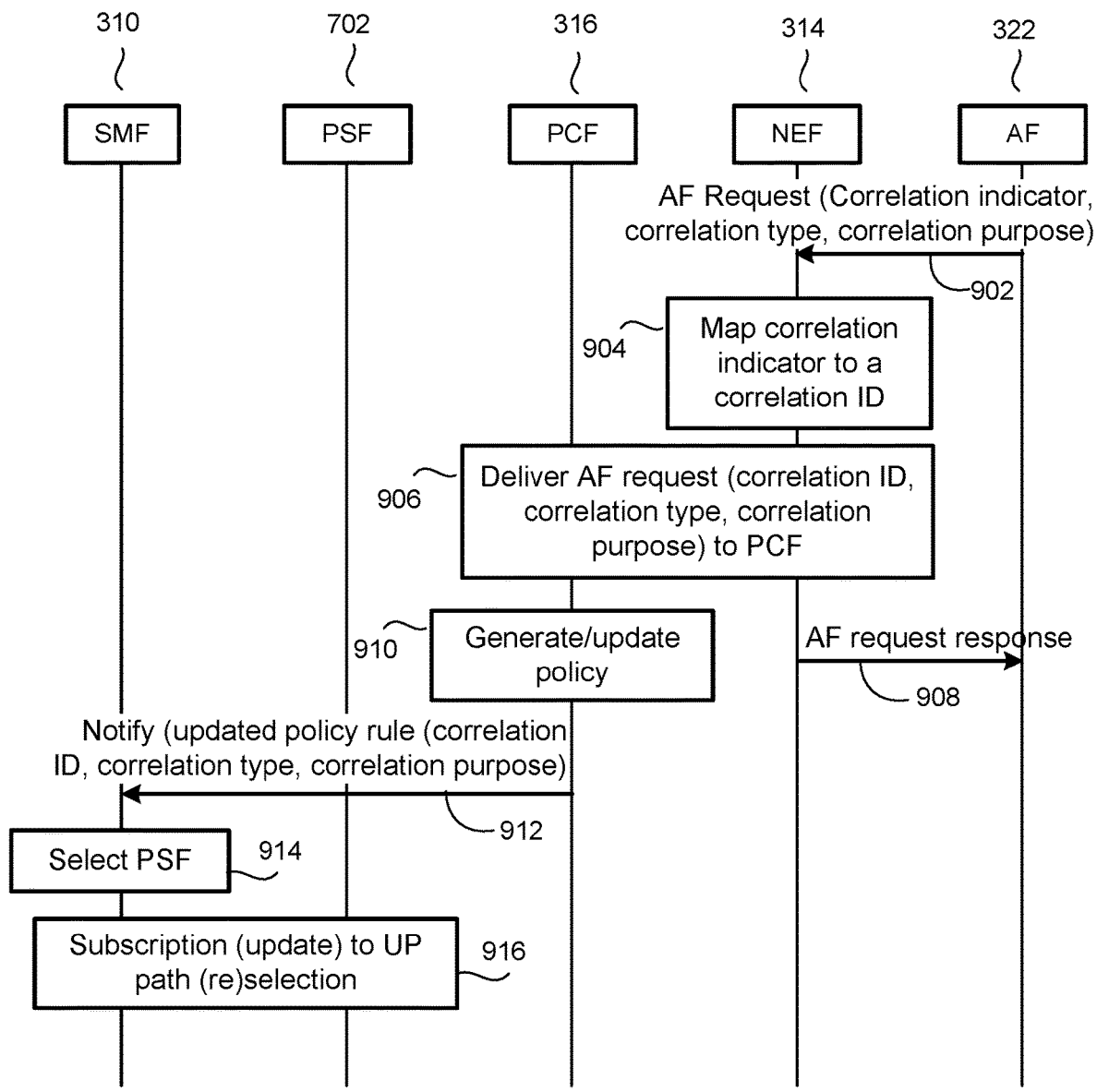
FIG. 9 is a message flow diagram illustrating an example procedure for AF influence on traffic routing for correlated PDU sessions with the PSF of FIG. 7.

In the examples of FIGS. 6-9, the AF generates an AF request message to request joint UP path optimization. In some embodiments, a P-CSCF 604 may act as the AF for this purpose, according to a request for joint UP path optimization received 616 from the IMS AS 606, as described above with reference to FIG. 6. This AF request may be provided to the PCF 316 via the NEF 314, which is illustrated in FIG. 9 and further described below. The NEF 314 may map the correlation indication in the AF request to a correlation ID. In some embodiments, the correlation ID may be identical to the AF transaction ID or the AF transaction internal ID. In other embodiments, the correlation ID may comprise the AF transaction ID and/or the AF transaction internal ID. In some embodiments, each of the AF transaction ID and/or the AF transaction internal ID, can uniquely identify the AF request. If the correlation indication (or correlation ID) comprises an indication of support for URLLC service, this indication of support for URLLC service may be reflected by (or form part of) the correlation ID. Alternatively, the indication of support for URLLC service may be retained as a field in the AF request separate from the correlation ID. In other words, the correlation ID either alone or in combination with an indication of support for URLLC service may map to the original correlation indication. Different correlations (e.g. specified in different AF requests) may be mapped to distinct correlation IDs. Therefore, correlations can be identified by their respective correlation IDs. The PCF 316 includes the correlation ID and the correlation type in the PCC rules that are generated by the PCF 316 according to the AF request and sent to the SMF 310 (e.g. based on the SMF's subscription). The SMF 310 retrieves some information from the PCC rules received from the PCF 316, e.g. the DNAIs, the correlation ID, and the correlation type, the correlation purpose, and provides the information to the PSF 702 for subscription to UP path (re)selection decision. The SMF 310 may also provide UE information, e.g. UE location, UE identifier (such as GPSI or SUPI), UE IP address, and/or PDU session information, e.g. PDU session ID, to the PSF 702 during subscription. The SMF 310 may update the subscription by updating the information provided to the PSF 702.

The PSF 702 uses the correlation ID and the PDU Session information in SMF subscriptions to identify correlated PDU sessions (that is, the PDU Sessions associated with the same correlation ID are correlated) and make joint UP path (re)selection decision for the correlated PDU sessions using the DNAIs and/or the correlation information (e.g. correlation type and/or correlation purpose) in the SMF subscription and the UP information stored in the storage function 704.

For multicasting purposes, the SMF 310 should configure the UPF to route the traffic simultaneously over N6 connections incidental to the UPF. For the purpose of anycasting, the SMF 310 or the PSF 702 may make an anycasting decision, for example by selecting appropriate virtual DNAIs. The anycasting decision may be based on the connection quality (e.g. throughput, delay performance) or cost between the UPF and the DNAI(s). If the decision is made by the PSF 702, the PSF 702 informs the SMF 310 about the decision together with or as part of UP path (re)selection decision. The SMF 310 configures the UPF to route traffic to the selected DNAI(s).

FIG. 9 illustrates an example procedure of AF influence on traffic routing for correlated PDU sessions with PSF 702. As mentioned earlier, the AF request procedure from FIG. 9 may be used for to provide the AF request as described in previous paragraphs in reference to FIGS. 6 to 8. Referring to FIG. 9, the AF 322 requests to influence traffic routing for multiple UE(s). The AF request may include an indication of correlation, an indication of correlation type, and an indication of correlation purpose. The AF request may also include weight information associated to each of the DNAI(s) provided as potential locations of application in the AF request. The weight information will be respected by the 5GCN during DNAI (re)selection. The AF 322 sends 902 the AF request to the NEF 314.

The correlation indication implies that the PDU sessions identified in the AF request are correlated for joint UP path (re)selection for the traffic identified in the AF request. The correlation type indication indicates whether joint DNAI (re)selection or joint UPF (re)selection is requested as part of joint UP path (re)selection. The correlation purpose indication may indicate the purpose of the correlation is for supporting the multicasting, anycasting or unicasting within or among the UEs (or UE group) identified in the AF request.

The NEF 314 maps 904 the correlation indication in the AF request to a correlation ID. The correlation ID may be unique across all the AF requests identified by an AF transaction ID. As mentioned earlier, in some embodiments, the correlation ID may be identical to the AF transaction ID or the AF transaction internal ID. In other embodiments, the correlation ID may comprise the AF transaction ID and/or the AF transaction internal ID. Each of the AF transaction ID and the AF transaction internal ID uniquely identifies the AF request. The NEF 314 transports 906 the information associated with the AF request to the PCF 316, directly or via the UDR 340. In some embodiments this operation may be as described in 3GPP TS23.501, clause 6.3.7.2. Furthermore, it should be appreciated the term "transports" in this context implies the NEF forwards the information. It should be appreciated that the NEF can forward the information, or process the information (e.g. map the external identifier(s) used in the information to internal identifier(s)) and transmit the processed information (e.g. containing internal identifiers(s) instead of external identifier(s)), or construct and transmit a new message including the information or the processed information. The NEF 314 responds 908 to the AF 322 to acknowledge the receipt of the AF request.

The PCF 316 generates or update 910 PCC rules according to the AF request received 906. The PCC rules may include information associated to the AF request, e.g. correlation ID, correlation type, correlation purpose, weight information associated to each of the DNAI(s) specified in the AF request. The PCF 316 notifies 912 the SMF 310 of generated or updated PCC rules, e.g. according to a subscription from the SMF 310.

The SMF 310 selects 914 a PSF 702 for subscription to UP path (re)selection decision for a PDU session related to the PCC rules received 912. This step is optional if the SMF 310 has already selected the PSF 702 for the PDU session.

The SMF 310 subscribes 916 to receive UP path (re) selection decision from the PSF 702 for the PDU session if it has not subscribed yet (e.g. when the notification from PCF 316 happens as part of the PDU session establishment procedure), or updates or remove the existing subscription if the AF request sent 902 from AF 322 modifies/updates/ removes existing AF request and the PCC rules received 912 subsequently causes change in subscription context (update to existing subscription or removal of an existing subscription). This step is similar to FIG. 8 when SMF-1 310A subscribes 802 to notification of UP path (re)selection for PDU session 1 or the subscription to UP path (re)selection decision as requested 818 by the SMF-2 310B for the PDU session 2 that is correlated to the PDU session 1.

During the subscription or subscription update, the SMF 310 may send to the PSF 702 the PDU session ID, UE identify information (e.g. IP address, MAC address, SUPI, GPSI) and the information, e.g. correlation ID, correlation type, correlation purpose, and DNAI(s) and weight information associated to each of the DNAI(s), received 912. The information sent by the SMF 310 to the PSF 702 may be stored by the PSF 702 as subscription context, as described elsewhere herein.

In some cases, this embodiment (described with reference to FIGS. 7-9) may be enhanced to support Ultra Reliable Low Latency Communication (URLLC) services, for example, when the URLLC service is to be accomplished through an upper layer such as an application layer. One scenario may be the following: the traffic of multiple UEs 102 (e.g. the traffic identified in the AF request) is duplicate traffic and aggregated at a virtual or physical entity (in the application layer) connected to the UEs 102 to ensure reliability and/or low latency of the end-to-end traffic or packet transmission between that entity and the application in the DN 306. Another scenario may be that a single UE 102 has two or more separate PDU sessions to access the URLLC service and the traffic is transmitted using these PDU sessions (duplicated in these PDU sessions for transmission) to ensure reliability and/or low latency of the end-to-end packet or traffic transmission between the UE 102 and the application in the DN 306. In this case, the 'correlation indication' or the indication of correlation in the AF request provided by the AF 322 may indicate that the correlation is for supporting URLLC service, and the 'correlation purpose' or the indication of correlation purpose in the AF request may consistently indicate multicasting. This information provided by the AF 322 reaches the PSF 702 using the procedures described with reference to FIG. 8 and FIG. 9 and the PSF 702 accordingly makes UP path (re) selection decisions for the correlated PDU sessions identified in the AF request. For example, if the indication of support for URLLC service is reflected by the correlation ID mapped from the indication of correlation in the AF request by the NEF 314 (in step 904 of FIG. 9), it will reach the PSF 702 naturally as the correlation ID reaches the PSF 702. If the indication of support of URLLC service is a separate field from the correlation ID after the NEF 314 performs information mapping toward the indication of correlation in the AF request (in step 904 of FIG. 9), the indication of support of URLLC service can be transported to the PSF along the same path as the correlation ID described with reference to FIG. 8 and FIG. 9. That is, the AF request information sent from the NEF 314 to the PCF 316 (in step 906 of FIG. 9) includes the indication. The policy rule(s) that is(are) generated by the PCF 316 according to the AF request information (in step 910 of FIG. 9), and are sent 912 to the SMF 310 (in step 912 of FIG. 9), include the indication. Further, the information provided by the SMF 310 to the PSF 702 for subscription or subscription update, includes the indication (as shown in step 916 of FIG. 9, which is similar to FIG. 8 when SMF-1 310A subscribes 802 to notification of UP path (re)selection for PDU session 1 or the subscription to UP path (re)selection decision as requested 818 by the SMF-2 310B for the PDU session 2 that is correlated to the PDU session 1). According to the indication of support of URLLC service received from the SMF during subscription or subscription update, the PSF 702 makes proper joint UP path (re)selection decision for the correlated PDU sessions to support the URLLC service. For example, the PSF 702 may ensure different/distinct UPFs are selected for the correlated PDU sessions in the UP path (re)selection decisions if the correlation type indicates joint UPF (re) selection. If correlation type indicates joint DNAI (re) selection, the PSF may ensure different/distinct DNAIs are selected for the correlated PDU Sessions in the UP path (re)selection decisions.

Figure 10:
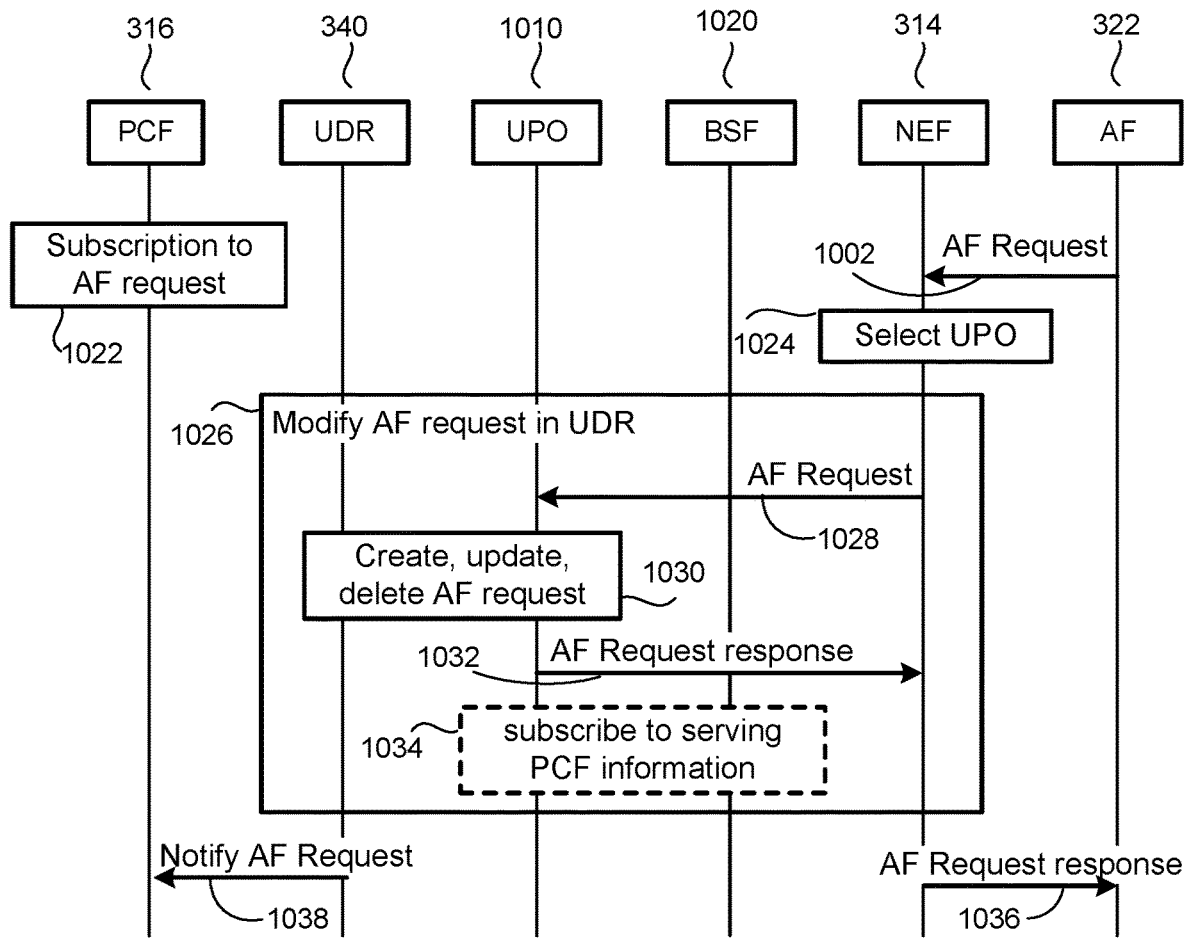
FIG. 10 is a message flow diagram illustrating an example procedure for AF requesting the network to perform joint UP path optimization for a group of UEs.

In example embodiment of FIG. 10, two levels of UP path (re)selection is applied. At the higher level, a UP optimizer (UPO) 1010 function jointly (re)selects DNAIs (including virtual DNAIs when the correlation type (or UP bridge type) indicates Joint UPF (re)selection or UPF-based UP bridging) for the correlated PDU sessions. The virtual DNAIs represent or map to or are equivalent to a different or the same UPF or an inter-UPF connection incident to the UPF, as described elsewhere (for UPF-based bridging)).

At the lower level, the serving SMFs 310 of these correlated PDU sessions (re)select UP paths independently for the PDU sessions according to the DNAI(s) selected by the UPO 1010. The UPO functionality may be offered by an existing CP function, e.g. PCF, NEF, NRF, UDM, UDR, AMF, NWDAF, NSSF, or by a special type of SMF, e.g. a master SMF, or by an independent function.

FIG. 10 shows an example procedure of AF 322 requesting the network to perform joint UP optimization for a group of UEs. The group of UEs' PDU sessions meeting the criteria specified in the AF request are correlated by the AF request, and their UPs are jointly optimized or (re)selected for efficiency or for meeting AF's requirement.

Referring to FIG. 10, the PCF 316 subscribes 1022 to receive notifications of AF request information from the UDR 340. The AF 322 requests to influence traffic routing for multiple UE(s). The AF request may include an indication of correlation, an indication of correlation type, and an indication of correlation purpose. The correlation type (alternatively, referred to as bridge type) indicates how the UPs are interconnected (i.e. how joint UP path management is to be done for the correlation), via DN 306 (or application location) based bridge (i.e. joint DNAI (re)selection) or via UPF based bridge (i.e. joint UPF (re)selection).

The NEF 314 selects 1024 a UPO 1010 according to the information in the AF request, e.g. according to the DNN, S-NSSAI, application ID, UE group information, and any combination of them. Other information in the AF request may also be used for UPO selection, as desired. A UPO 1010 may have a service area defined based on the information in the AF request. Optionally, the UPO 1010 may be configured to have a service area defined, e.g. by the OAM, before the AF request. Selection 1024 of the UPO 1010 may include determining whether a particular UPO's service area covers or matches the information provided in the AF request.

The NEF 314 sends 1028 the AF request to the UDR 340 via the selected UPO 1010. The UPO 1010 may process the AF request and sends 1030 the processed AF request to the UDR 340 for delivering to relevant PCFs 316. From the PCF 316/UDR 340 point view, the UPO 1010 appears to be an internal 'AF' in this procedure 1026.

The NEF 314 sends 1028 the AF request to the selected UPO 1010. Before sending, it may map the some of the information in the AF request to information to be used internally in the network. An example mapping is described in 3GPP TS23.501, clause 5.6.7 and clause 4.16.10.

The UPO 1010 may perform further information mapping toward the AF request received 1028 from the NEF 314. For example, it maps the receiver information of UP path management event notification in the AF request to information of itself so that the notification is sent to it rather than to the receiver specified in the AF request. It may also augment the AF request with new information. For example, the UPO 1010 may augment the AF request with a subscription to UE mobility events with the UPO itself being the receiver of the UE mobility information. The UPO maintains the context of the AF request, e.g. the mapping between the AF request transaction ID and the NEF 314. The UPO 1010 sends the AF request to the UDR. This may cause information associated to the AF request in the UDR to be created, updated, or deleted 1030, depending on the purpose of the AF request (whether it is a new AF request for influencing traffic routing, or to update an existing AF request, or to delete an existing AF request).

The UPO 1010 responds 1032 to the NEF 314. The response indicates the acceptance of the AF request. The UPO 1010 may subscribe 1034 to the binding support function (BSF) 1020 to receive information of serving PCF 316 of PDU sessions related to the AF request. To do the subscription, the UPO 1010 interacts with the UDM to obtain the identity information (e.g. SUPI or GPSI) of the UEs within the UE group identified in the AF request. It may provide the UE group ID to the UDM and the UDM returns the UE identify information back. The UPO 1010 provide DN information, e.g. DNN, slice information, e.g. S-NSSAI, UE identity information, e.g. SUPI, GPSI, and/or IP or MAC address to the BSF 1020. The DN information and the slice information are obtained from the AF request received 1028. The BSF 1020 notifies the UPO 1010 about the information of the PCF 316 (e.g. PCF ID or network address of the PCF) once a binding is created, modified, or removed between the PCF 316 and a PDU session that has matching properties (i.e. with matching DN information, slice information, UE identity information). The binding implies the PCF 316 is the serving PCF of the PDU session. This step 1034 is optional. In other embodiments, the UPO can communicate with the PCF directly, i.e. without involving UDR 340 (in which case step 1030 becomes optional).

This step may be similar to the steps 2 and 3 in the procedure specified in TS 23.502, clause 4.3.6.4 except that they are for subscription rather than for one-time discovery.

The NEF 314 responds 1036 to the AF 322. The response indicates the acceptance of the AF request. The UDR 340 notifies 1038 the PCF 316 of the AF request information according to the SMF's subscription 1022 to such notifications. It should be noted that at step 1038, the AF request notified to the PCF 316 is the AF request provided by the UPO at step 1030, which may not be identical to the AF request in 1002 or the AF request in 1028. The AF request provided to UDR 340 by the UPO 1010 at step 1030 may be different from the AF requests 1002 and/or 1028 because the UPO 1010 may process/change the AF requests 1002 and/or 2028 received and send the processed/changed AF request to the UDR 340 as described elsewhere herein.

Figure 11:
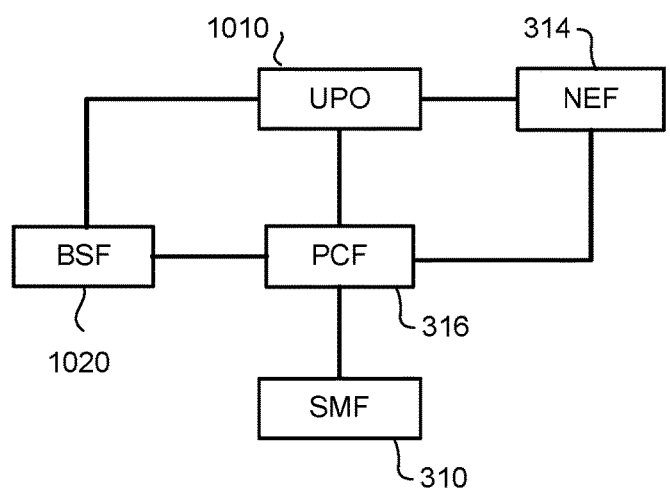
FIG. 11 is a block diagram illustrating another example architecture for path selection functionality in the system architecture of FIG. 3.

FIG. 11 illustrates an example architecture in which the DNAI selection functionality of the SMF 310 is split into a separate function, UP Optimizer (UPO) 1010, which influences the SMF's UP path (re)selection decisions for PDU sessions by providing DNAI (re)selection decisions to the SMF 310 via the PCF 316. To influence SMF's UP path (re)selection decisions, the UPO 1010 acts as an AF 322 and performs AF influence on traffic routing, targeting the PDU sessions.

There may be multiple UPOs 1010 in the network. When the NEF 314 receives 1002 an AF request that indicates PDU session correlation, the NEF 314 may select 1024 the UPO 1010 using information associated to the AF request, e.g. DN information (e.g. DNN), application information (e.g. application ID), slice information (e.g. S-NSSAI), and/or local configuration (e.g. locally configured UPO information such as an identifier or a network address of the UPO 1010). The NEF 314 provides any of these information to the NRF 318, and the NRF 318 returns the information of corresponding UPO 1010 (e.g. network address). The UPO selection may also be pre-configured in the NEF 314, e.g. by the OAM.

The UPO 1010 may act on behalf of the NEF 314 (or the AF 322) to interact with the PCF 316 to influence SMF traffic routing decision for the correlated PDU sessions and for the traffic identified in the AF request, and to subscribe to notifications of relevant UP path management events. The UPO 1010 may provide information associated to the AF request to the PCF 316 via UDR 340 (for example by acting as AF and using the technique described in 3GPP TS23.501, clause 6.3.7.2 and TS 23.502, clause 4.16.10). In the information provided to the PCF 316 the UPO 1010 may replace the NEF information or the AF information with its own information, or include its own information so that from the PCF 316 or the SMF 310 point of view, the UPO 1010 is the NEF 314 or the AF 322.

The UPO 1010 may interact with the BSF 1020 to identify the serving PCFs 316 of the correlated PDU sessions, as described elsewhere herein. By doing this, the UPO 1010 may provide the information associated to the AF request to the identified PCFs 316 directly. This is similar to the procedure in TS 23.502, clause 4.3.6.4 with the UPO acting as the NEF in the procedure. Then, the UPO 1010 may not need to interact with the UDR 340.

The UPO 1010 is associated with a storage function. The storage function may be a separate CP function, e.g. UDM, UDR, USDSF, or an internal function of the UPO 1010. The UPO 1010 stores the AF request information and the context of the AF request (e.g. NEF information such as ID or network address, AF information such as ID or network address) into the storage function. In addition to the AF request context, the storage function may store UP information necessary for making DNAI (re)selection decision. The UPO 1010 (re)selects DNAI for PDU sessions based on the AF request information and the UP information in the storage function. As discussed above, as an alternative, in some embodiments, the UPO can communicate with the PCF directly.

The UPO 1010 jointly optimizes the UP paths (i.e. DNAI (re)selection) of correlated PDU Sessions. Because a PDU Session may be used to access multiple applications, the joint optimization may impact only a branch of the UP path of the PDU Session, i.e. the branch connecting to the application for which the correlation is specified for.

A PDU session may be involved in two separate correlations, in which the two separate correlations may be indicated by separate AF requests from the AF 322. Since, each AF requests may have a unique AF transaction ID or AF transaction internal ID, the UPO 1010 may distinguish among the separate correlations according to respective AF transaction IDs or AF transaction internal IDs. When a PDU session is involved in two separate correlations, one correlation should not impact the UP path efficiency of the PDU session in the other correlation. This can be achieved by having two UP path branches in the UP path of the PDU session, one for each correlation, and optimizing the two branches (i.e. the (re)selection of DNAIs associated with the two branches) separately for the two corresponding correlations.

The UP information stored in the storage function associated to the UPO 1010 may include UP topology information and analytical information related to UP. UP topology information may include information about UPF interconnection and associate properties (such as throughput capacity, delay performance, and cost), and UPF properties (such as IP address, location, processing capacity), and similar information for interconnection between UPF and DNAI and for DNAI. UP-related analytical information may indicate statistical load and/or cost of UPFs and statistical load of interconnections between UPFs at a per-slice level or at a per-DN-per-slice level, and similar information for interconnection between UPF and DNAI and for DNAIs.

The UP information may be provided by an information provider, for example, the OAM or the NWDAF, and it may be stored into the storage function via the UPO 1010. That is, the UPO 1010 receives the information from the provider (s) and then sends it to the storage function for storage or update. Alternatively, the information may be provided by the provider(s) directly to the storage function for storage or update.

In some embodiments, the UPO 1010 obtains UP-related analytical information from the NWDAF. The UPO 1010 sends a request to the NWDAF for subscription of notifications of such information or update/change of such information. The subscription request may include notification criteria, i.e. under what conditions a change in UP-related analytical information should be updated or notified to the UPO 1010. The criteria may include a periodic timer value (for periodic report upon timer expiry), and/or threshold value (for event based reporting when remaining/available capacity is below or loading exceeds the given threshold value). The NWDAF may respond to the UPO 1010 to acknowledge receipt of the request. The response may include UP-related analytical information that the UPO 1010 subscribed to. The NWDAF notifies the UPO 1010 of the UP-related analytical information or UP-related analytical information changes. For the subscription request from the UPO 1010, the first notification may replace the response in order to save message (i.e. the notification serves as the response). The notification may happen periodically when UP-related analytical information change, e.g. when the notification criteria specified in the subscription request or in local configuration are met.

Figure 12A:
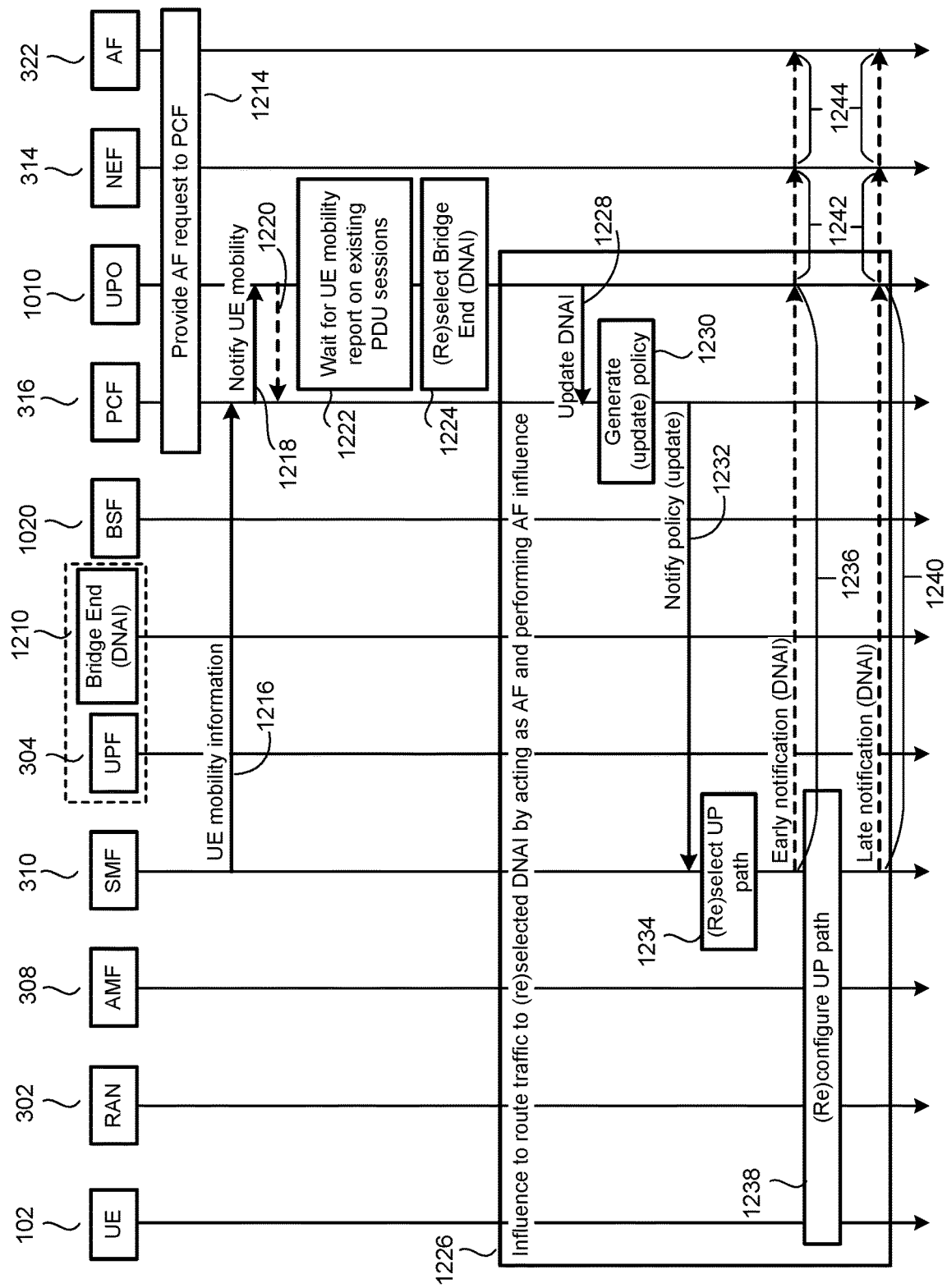
FIGS. 12A and 12B show a message flow diagram illustrating an example procedure of joint UP path optimization or (re)selection by the UPO of FIG. 11.
Figure 12B:
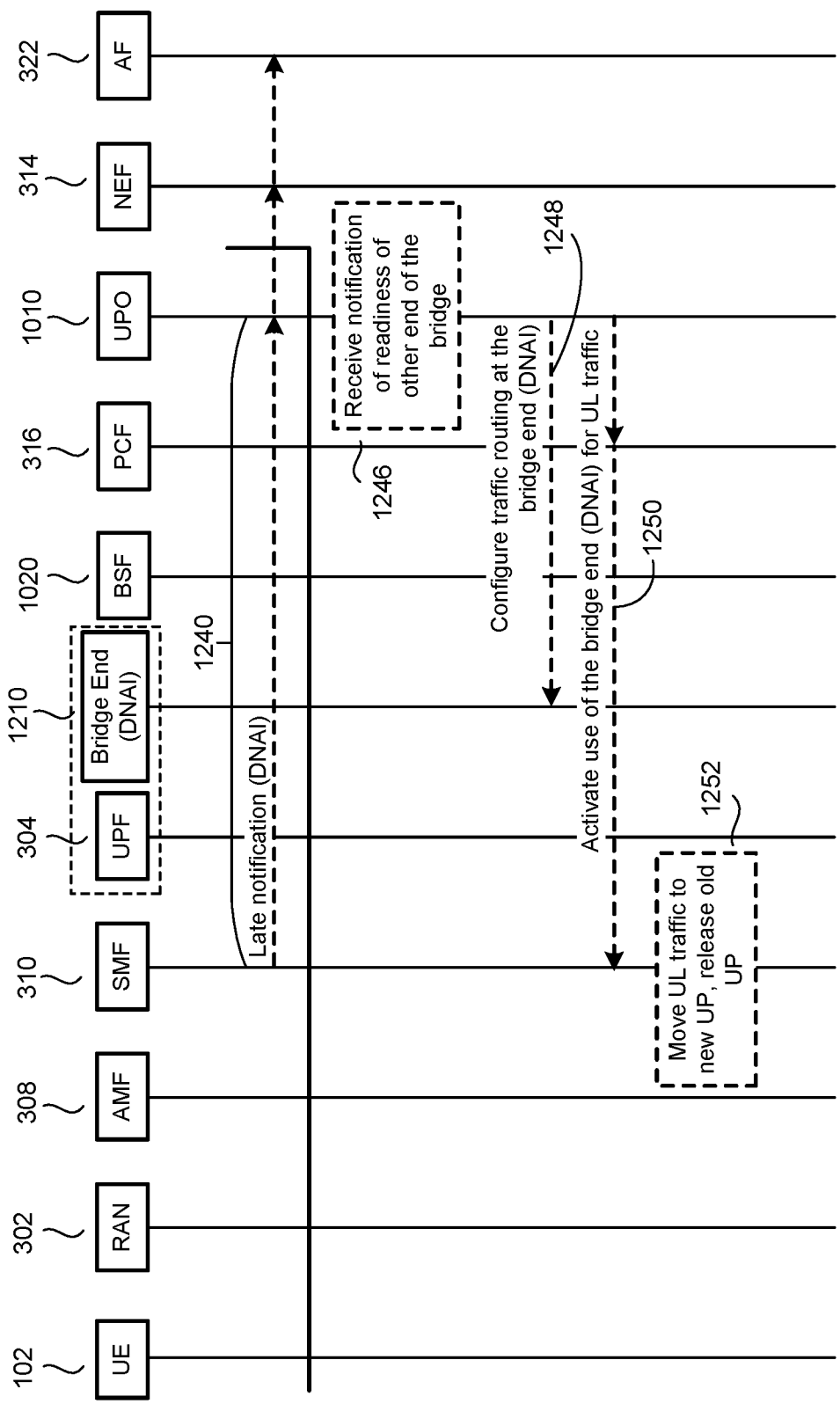

FIGS. 12A and 12B show an example process for joint UP optimization/(re)selection. Although the FIGS. 12A and 12B show a single PDU session, the procedure applies to all the PDU sessions correlated by the AF request.

Referring to FIG. 12A, the AF 322 requests the network to jointly optimize UP paths for a group of UEs 102 for certain traffic as described above with reference to FIG. 10. This step is delivered 1214 to the PCF 316 through the procedure as described above with reference to FIG. 10, where a UPO 1010 is selected and indicated to the PCF 316 such that the UPO 1010 appears to be an internal AF to the PCF 316. The PDU sessions related to the AF request are correlated by the AF request for joint UP path optimization.

The SMF 310 sends 1216 information of UE mobility to the PCF 316 according to a subscription of the PCF 316. The PCF subscription to notifications of UE mobility from the SMF 310 may be performed when the PCF 316 receives 1214 the AF request. The UE mobility information in the notification sent 1216 from the SMF 310 to the PCF 316 may include the UE's location or indicates an event of the UE entering or leaving a particular area of interest defined in the PCF subscription for the UE 102.

The PCF 316 notifies 1218 the UE mobility information to the UPO 1010 according to the subscription information in the AF request received 1214. The UPO 1010 may respond 1220 to the notification as indicated by the dashed line. The response is optional.

The UPO 1010 may wait 1222 for UE mobility information notification from the serving PCFs of existing PDU sessions related to the AF request. The UPO 1010 jointly determines 1224 the UP bridge for the PDU sessions that it knows the UE mobility information of (through the notification 1218 from PCF 316).

The UP bridge connects the UP path of the PDU session with the UP paths of other PDU sessions for which the joint UP optimization is requested 1214 (i.e. correlated PDU Sessions). It can be DN based (or in other words, application location based, e.g. UP paths of correlated PDU sessions are connected via common DNAI) bridge or UPF based bridge (e.g. UP paths of correlated PDU sessions are connected via common UPF or direct inter-UPF connection (without involving the DN)).

UP bridge type (DN based, UPF based) may map to the correlation type described elsewhere herein. DN based bridge maps to Joint DNAI (re)selection, and UPF based bridge maps to Joint UPF (re)selection. The UP bridge may be a DNAI, a UPF, or a link between DNAIs or a link between UPFs.

The UPO 1010 makes the joint optimization decision according to the UP information (preconfigure and/or received from NRF 318 or NWDAF) and the UE mobility information (received 1218) and the AF request information (received 1214), as described elsewhere herein.

The UPO 1010 provides 1228 the UP bridge information to the PCF 316 as DNAI information for the PDU session and for the traffic to influence SMF's traffic routing decision for the PDU session. This is similar to per PDU session specific AF request (targeting a specific PDU session), that is, the UPO 1010 acts as AF 322 and sends an AF request to the PCF 316, targeting the PDU session with the selected DNAI. The UPO 1010 may also provide N6 traffic routing information associated to the selected DNAI to the PCF 316 in this step; the information is to be configured in the UPF to support the correlation purpose: multicasting, anycasting or unicasting as described elsewhere herein.

If the UP bridge is DN based, the DNAI information indicates the application location (DNAI) selected by the UPO 1010 for the PDU session. If the UP bridge is UPF based, the DNAI information indicates a virtual DNAI selected by the UPO 1010 for the PDU session, which maps to a UPF or a connection between two UPFs.

The sub-steps 1226-1244 are similar to the steps in the AF influence feature described in TS23.502, clause 4.3.6. In particular, the UPO 1010 sends 1226 an AF request including the (re)selected DNAI to the PCF 316. The PCF 316 generates or update 1230 PCC rule(s) according to the AF request received 1228. The PCF 316 notifies 1232 the PCC rule(s) to the serving SMF 310 of the PDU Session according to a subscription of the SMF to such notifications. The PCC rules include the (re)selected DNAI information received 1228. The SMF 310 (re)selects 1234 UP path for the PDU Session according to the DNAI information received 1232. The SMF 310 notifies 1236 the UPO 1010 of the UP path (re)selection; this is an early notification. The SMF 310 (*re*)configures 1238 the UP path to implement the UP path (re)selection decision 1234. The SMF 310 notifies 1240 the UPO 1010 of the UP path (re)selection; this is a late notification. When UPO 101 receives the early 1236 and late 1240 notifications, the UPO 1010 identifies the corresponding NEF 314, if the AF 322 provides 1214 AF request to the PCF 316 via the NEF 314, and sends 1242 the notification to the NEF 314 which then sends 1244 it to the AF 322. If the AF 322 provides 1214 AF request to the PCF 316 without using NEF 314, in these sub-steps, the UPO 1010 identifies the AF 322 and sends the notification to the AF 322 directly.

Referring to FIG. 12B, the UPO 1010 receives 1246 the late notification about the other ends of the UP bridge. This implies the UP bridge is ready. The UPO 1010 configures 1248 the bridge end 1210 for traffic routing over the UP bridge, e.g. to support anycasting, multicasting, unicasting, etc.

The traffic routing behavior can be part of the N6 traffic steering information configured at the UPF. The N6 traffic steering information is associated with the anycasting, multicasting or unicasting address, which can be detected through traffic detection rules that specifies the address. That is, if multicasting, anycasting or unicasting traffic is detected according to the rules, the corresponding traffic steering behavior is performed toward the traffic as specified in the N6 traffic steering information. The traffic detection rules may be configured in the UPF through a separate procedure.

Here, the UPO 1010 configures or updates the corresponding N6 traffic steering information to reflect the UP bridge change or update. This step is optional if the bridge is DN based or if the N6 traffic routing information is provided 1226 to the PCF 316 (in which case, the SMF 310 will obtains it as part of the PCC rule and configures it into the UPF 304, as described in 3GPP TS23.501, clause 5.6.7.

The UPO 1010 notifies 1250 the SMF 310 to activate the UP bridge. This can be performed as a response to the late notification 1240. This step is similar to FIG. 13 where the AF 322 responds 1314 to SMF 310 in receiving 1312 a late notification from the SMF 310 of a UP path (reconfiguration). A more detailed, generic description about such a response mechanism can be found below.

The SMF 310 configures 1252 the RAN 302 or UPFs 304 so that UL traffic and/or DL traffic can be routed toward the UP bridge. The SMF 310 releases resources related to the old UP path. Referring to FIGS. 12A and 12B, some steps, as indicated by dashed lines and boxes, may be optional. For example in FIG. 12A, steps 1220, 1236, 1240, 1242 and 1244, and in FIG. 12B, steps 1240, 1246, 1248, 1250, 1252 may be optional in some embodiments An embodiment of the present disclosure enhances the AF influence feature (TS 23.501, clause 5.6.7) by allowing the AF 322 to confirm or reject DNAI selection made by the SMF through a response to notifications of UP path management events received from the SMF 310.

In an AF influence procedure according to an embodiment, the AF 322 may provide in AF request a list of suitable DNAIs for the application (e.g., potential locations of the application). The SMF 310 selects one of those DNAIs to use for the PDU session associated to the application traffic. At the time of selection, the DNAI may be temporarily unavailable, e.g. due to transient overloading or runtime failure. When the AF 322 is informed of the DNAI selection, it may send a new AF request to influence the SMF's DNAI selection decision so as not to use the unavailable DNAI for the PDU session. At the same time, the SMF 310 proceeds with setting up the UP path to the unavailable DNAI. Later, when the SMF 310 receives the updated PCC rules (reflecting the unavailability of the selected DNAI), it performs DNAI reselection, reconfigures the traffic steering at the UPF toward a newly selected DNAI. In this scenario, transient unavailability of application location is reported using AF request through a 'slow' path via PCF 316 to the SMF 310. The slow path may cause packet loss and interrupt upper layer session and service continuity, before the SMF 310 receives the information and can react on it.

The DNAI usage information including N6 traffic routing information in the AF request (thus in the derived PCC rule that is generated based on the AF request) are long-term guidance and may be a statistical decision of the AF 322 (e.g. based on the potential UE location/population, statistic loading of potential application location). It is not supposed to change very frequently. In some cases, the AF 322 may however need to update some N6 traffic routing information (e.g. port number) related to the DNAI to the SMF 310 after knowing the DNAI is selected. This may be due to, for example, dynamic instantiation of the application and can be determined only on the fly. This type of N6 traffic routing information update is very dynamic and in nature not a policy requirement. If the AF 322 informs the SMF 310 of the information update through AF request, the update needs to traverse a 'slow' path to reach the SMF 310, delaying the use of the new DNAI for UL traffic.

Hence, a runtime direct interaction is needed between the SMF 310 and the AF 322 to deal with transient factors such as temporary unavailability of DNAI and dynamic N6 traffic routing parameter negotiation during UP path management. For example, the SMF 310 may maintain the old UP path (including the N6 traffic routing associated to it) until it receives a response from the AF 322 confirming the DNAI selection. If the SMF 310 receives a response rejecting the DNAI selection, it should reselect a DNAI (and possibly UPF) among the currently available ones. When the AF 322 responds to the SMF 310 to confirm the DNAI selection, the AF may include updated N6 traffic routing information related to the selected DNAI in the response sent to the SMF 310. The SMF 310 can obtain the information from the AF response and configures it into the UPF without involving the PCF 316.

The interaction between SMF 310 and AF 322, as described above, does not change the DNAI usage information in the PCC rules. It provides the AF 211 with a means of informing the SMF 310 of the completion of application relocation, e.g. in the case of late notification, so that the SMF 310 can safely release any PDU resource associated to the old UP without jeopardizing upper layer session and service continuity.

In some embodiments, the AF 322 may provide topological information indicative of desired or preferred topological properties of the interconnection between correlated PDU Sessions. For example, the AF may indicate that the UP paths of the correlated PDU Sessions should be connected via a tree topology, a ring topology, or a star topology. The topology may comprise the PSAs of the correlated PDU Sessions and the interconnection in between. The interconnection refers to the logical connections (e.g., in the form of tunnels) established by the network between the PSAs for the correlation as indicated by the AF 322. That is, the topology embeds a tree structure, a ring structure, or a star structure. In the PSF embodiments, for example, referring to FIG. 9, the topological information is provided by the AF 322 together with or as part of the correlation information to the PCF 316, e.g. at step 902. The PCF 316 then includes the topological information in the PCC rules generated according to the AF request at step 910 and sends the PCC rules containing the topological information and correlation information to the SMF at step 912. The SMF then provide information associated with, and/or information in, the PCC rules, e.g. the topological information and correlation information, to the PSF 702 during subscription to UP path (re)selection decision at step 916. In the UPO embodiments, the topological information is provided by the AF together with or as part of the correlation information to the UPO, for example, referring to FIG. 10, via steps 1002 and 1028. In both cases, after obtaining or receiving the information, the core network function (CNF) (PSF or UPO) may perform joint UPF (re)selection accordingly. The joint UPF (re) selection causes the PSAs of the PDU Sessions and the interconnection established between them to bear the topololgy structure (e.g. tree, ring, star) requested or indicated by the AF 322 in the AF request. Note that when a star topology is indicated by the AF 322, the indication may be similar to the AF indicating a common UPF is to be selected or a common DNAI is to be selected. In some embodiments, the presence of one of topological information and correlation information may indicate the presence of the other. For example, if the topological information is included in the step(s) 902, 912 and/or 910 in FIG. 9 associated with the PSA embodiments, or in the steps 1002 and 1028 in FIG. 10 associated with the UPO embodiments, then, this implies the presence/existence of correlation; similarly, if the correlation information is included in step(s) 902, 912, and/or 910 in FIG. 9 associated with the PSA embodiments, or in the step 1002 and 1028 in FIG. 10 associated with the UPO embodiments, a default topological information (e.g. a star topology as a preferred topology) may be assumed.

The following description provides a representative technique for enabling runtime coordination between AF 322 and 5GCN for supporting application relocation without breaking upper layer session and service continuity. This technique enhances the conventional AF influence feature (defined in 3GPP TS23.501, clause 5.6.7, for example) by allowing the AF 322 to confirm or reject DNAI selection decisions made by the SMF 310 through a response to notifications of UP path management events received from the SMF 310.

For the purpose of the present description, it is assumed that the UP path includes a DNAI. UP path configuration then includes configuring N6 traffic routing at UPF toward the DNAI.

In an AF influence procedure according to an embodiment, when the AF 322 subscribes to receive notifications of UP path management events, the AF 322 may optionally include an indication in the AF request that an AF response is to be expected by the 5GCN. This indication implies that the AF 322 will provide a response to the received notifications of UP path management events to the 5GCN. The PCF 316 provides the indication to the SMF 310 as part of PCC rules generated by the PCF 316 according to the AF request and sent to the SMF 310.

According to the 'AF response is to be expected' indication in the PCC rules, the SMF 310 waits for a response from the AF 322 after sending to the AF 322 a UP path management event notification that includes a selected DNAI. The UP path management event notification may include information of response receiver (i.e. receiver of the response message), e.g. IP address and port number of the SMF 310. While waiting, the SMF 310 maintains the old UP path if the old UP path exists. The AF 322 sends a response to the SMF 310 using the response receiver information in the notification. In other words, the SMF 310 is configured to maintain the old path in response to receiving such an indication in the PCC rule from the PCF 316. The SMF maintains the old path until after the SMF 310 receives from the AF 322 a response indicating that the selected DNAI is ready for the new path. It is noted that in other embodiments, the SMF can change the path without waiting, for situations where the AF does not send such an indication.

If the SMF 310 sends the UP path management event notification to the AF 322 via the NEF 314, the NEF 314 maps the receiver information in the notification to its own information. In this case, the AF response will be sent to the NEF 314 and the NEF 314 forwards it to the SMF 310.

The AF response may be a positive response or a negative response, which respectively confirms or rejects the DNAI selection indicated in the SMF notification. In the case of positive response, the AF response may include updated N6 traffic routing information (e.g. port number) related to the selected DNAI. In the case of negative response, the AF response may indicate a list of other DNAIs not to be selected among the DNAIs specified in the AF request.

The SMF 310 takes proper actions according to the AF response. When the AF response is a positive response, the SMF 310 can proceed with relevant steps (e.g. configuring new UP path (including enforcing the establishment, release or change of a DNAI and/or addition, relocation, or removal of a UPF) or safely releasing the old UP path) in the current procedure. When the AF response is a negative one, the SMF 310 keeps the old UP path being maintained. In some embodiments, the SMF may perform an additional DNAI reselection; and, if no DNAI is currently available, the SMF 310 may release the PDU session.

Figure 13:
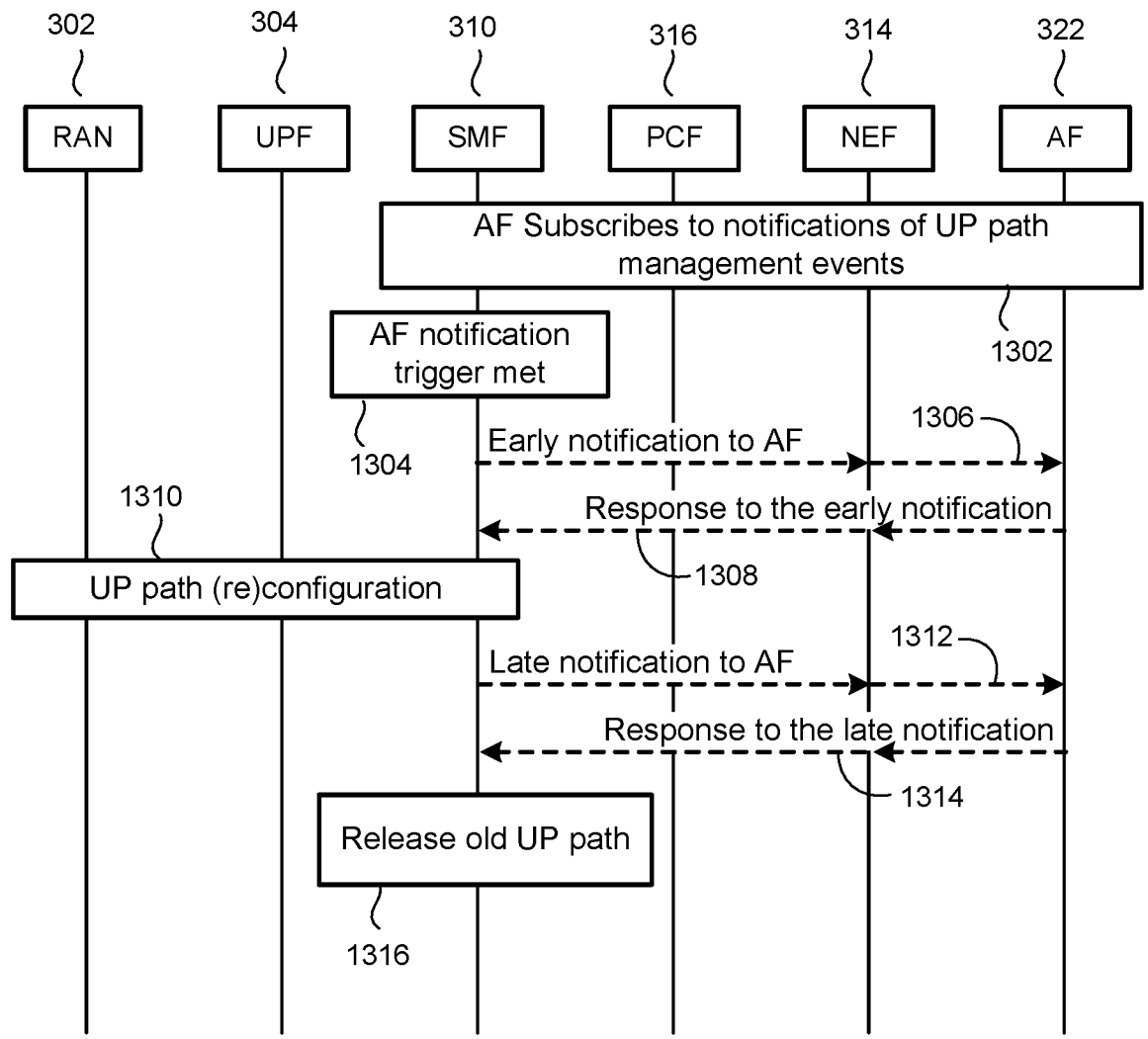
FIG. 13 is a message flow diagram illustrating an example procedure for AF response to UP path management event notifications.

FIG. 13 illustrates a representative procedure of AF response to UP path management event notifications. Referring to FIG. 13, the AF subscribes 1302, by sending an AF request to the 5GCN, to receive notifications of UP path management events from the SMF 310 using the technique described in 3GPP TS23.501, clause 5.6.7. The AF request may include an indication that an AF response is to be expected from the AF 322 for such a notification. The AF request is transported to the PCF 316 via the 5GCN control plane.

A condition for an AF notification has been met 1304 as described above. The SMF 310 maintains the old UP path if the old UP path exists (e.g. in the case of UP path reselection). In case of early notification requested by the AF 322, the SMF 310 notifies 1306 the intended AF 322 of the target DNAI of the PDU Session. The AF 322 sends 1308 a response to the SMF 310. The response may be a positive response or a negative response, to the early notification 1306.

The SMF 310 (re)configures 1310 the UP path, including enforcing the change of DNAI and/or addition, relocation, or removal of a UPF. In case of late notification requested by the AF 322, the SMF 310 notifies 1312 the AF 322 of the selected target DNAI of the PDU Session. The AF 322 sends 1314 a response to the SMF 310. The response may be positive response or a negative response, to the late notification 1312.

The SMF 310 may release 1316 the old UP path if the old UP path exists, after receiving a positive AF response 1314.

As may be appreciated, the procedure described above with reference to FIG. 13 may involve changes in conventional behaviours of the PCF 316 and SMF 310. These changes may be summarized as follows.

The PCF 316 behavior may be changed by configuring the PCF 316 to accept AF request that includes an indication of 'AF response is to be expected' and include the 'AF response is to be expected' indicator in the AF request in PCC rule generated according to the AF request.

The SMF 310 behavior may be changed by configuring the SMF 310 to wait for a response from the AF 322 after sending a UP path management event notification to the AF 322 if the PCC rules include an indication of 'AF response is to be expected'. The SMF 310 behavior is further configured to maintain the old UP path while waiting for the AF response relating to the UP path management event notification; and after receiving the AF response, the SMF 310 is further configured to take proper actions according to the AF response. Taking proper actions by the SMF 310 may include: e.g. reselect the DNAI, configure the UP path, and/or release the old UP path.

The following description provides a representative technique for preserving UE IP address during UPF relocation, according to an embodiment. This technique enhances the conventional AF influence feature (defined in 3GPP TS23.501, clause 5.6.7, for example) by allowing the AF 322 to indicate to preserve the UE IP address in the AF request. In other words, the AF 333 sends an AF request to a session management function (SMF) via the PCF (and optionally via the NEF), the AF request including an indication that the UE IP address associated with traffic identified in the request should be preserved. In other words, the UE IP address should be maintained. In some embodiments, the network should prevent a change of the UE IP address for the PDU session.

Figure 15:
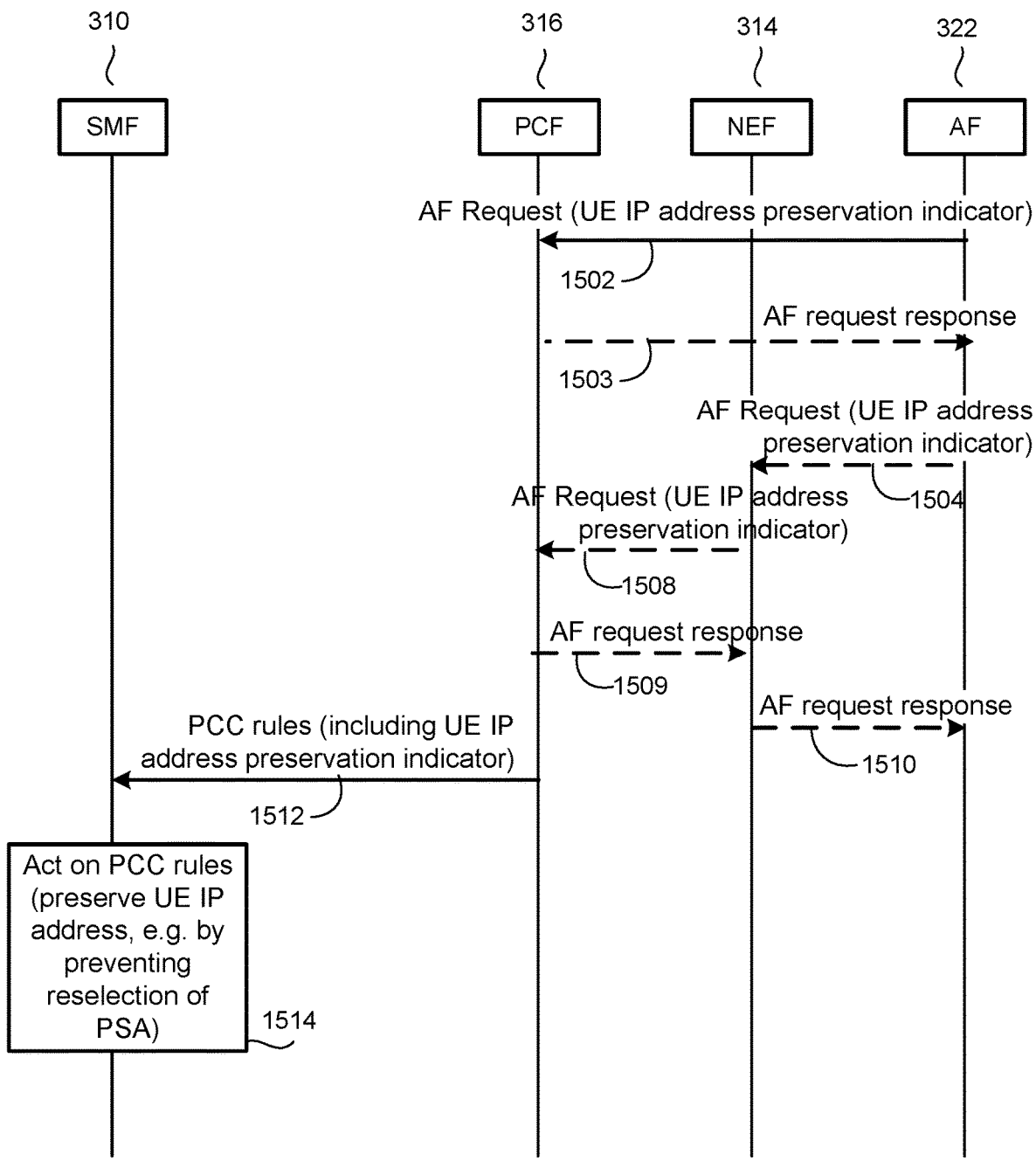
FIG. 15 is a message flow diagram illustrating an example procedure for AF requesting preservation of UE IP address.

FIG. 15 is a message flow diagram illustrating an example procedure for AF requesting preservation of UE IP address. In an AF influence procedure according to an embodiment, when the AF 322 sends an AF request 1502 to influence traffic routing, the AF 322 may optionally include an indication in the AF request that the UE IP address associated with the traffic identified in the AF request should be preserved. This IP address preservation indication (or 'no IP address change' indication) may imply that IP address change is not supported for the UE(s) in the application (or DN) side. The PCF 316 provides the indication 1512 to the SMF 310 as part of PCC rules generated by the PCF 316 according to the AF request and sent to the SMF 310 for relevant PDU Sessions. It is noted that in some embodiments, the AF 322 can send the AF request 1502 directly to the PCF 316. The PCF 316 may respond to the AF request 1502 by an AF request response 1503, acknowledging receipt of the AF request 1502. In other embodiments, the AF 322 can send the AF request to the PCF 316 via the NEF 314 by sending the AF request 1504 to the NEF. The NEF 314 in turn transmits the AF request 1508 to the PCF 316. It should be appreciated that the NEF 314 can either forward the AF request (possibly after performing information mapping on the AF request, e.g. mapping external identifier(s) included in the AF request to internal identifier(s) so that the AF request includes internal identifier(s) instead of the external identifier(s)), or create a new message containing the information (or mapped information) in the AF request 1504. In such an embodiment, the PCF 316 may optionally respond to the AF request 1508, by sending an AF request response 1509 to the NEF 314, acknowledging the receipt of the AF request, and the NEF 314 can forward the AF request response 1509 to the AF 322, or generate and send an AF request response 1510 to the AF 322, acknowledging receipt of the AF request 1504.

According to the IP address preservation indication (or 'no IP address change' indication) in the PCC rules, the SMF 310 may act on the PCC rules 1514. This can include, for example, an action to preserve UE IP address associated to the traffic identified in the AF request.

In some embodiments, the SMF 310 may prevent reselection/relocation of the PDU Session Anchor (PSA) (which is a UPF 304 through which the UP path of the PDU Session is connected to the DN 306) that the UE IP address is associated to.

In some embodiments, step 1514 may include selecting a proper SSC mode for the PDU session, e.g. setting the SSC mode of the PDU session to SSC mode 1.

Alternatively, another way to achieve UE IP address preservation, where reselection of PSA is allowed, the SMF 310 may be configured to allow the 5GCN and the DN 306 (or the AF 322) to negotiate N6 traffic routing information for the application traffic through the AF influence feature (as described in 3GPP TS23.501, clause 5.6.7, for example). The AF 322, on behalf of the DN 306, indicates DN-related N6 traffic routing information associated to the application location (i.e. DNAI) to the 5GCN in the AF request sent to the PCF 316, (as described in 3GPP TS 23.501, clause 5.6.7, for example). The SMF 310 obtains the UE IP address preservation indication and the DN-related N6 traffic routing information (both of which are included in the PCC rule(s) that are generated by the PCF 316 according to the AF request and sent to the SMF 310) from the PCF 316 and configures the traffic steering at the UPF 304 accordingly, the UPF 304 being the PSA. This allows the 5GC to route UL traffic to the application properly. When the PDU Session Anchor (PSA) related to the traffic identified (e.g. the PSA selected to route the traffic to the DN) in the AF request has been established or changed, the SMF 310 may notify the AF 322 of the PSA-related N6 traffic routing information and the UE identity information (according to a subscription of the AF 322 for such notifications, e.g. notifications of UP path management events). In some embodiments, the AF 322 may need to respond to the SMF 310 to provide some updated information about N6 traffic routing (e.g. N6 routing parameters like port number) that are generated on the fly and for this purpose the AF 322 may indicate 'AF response is to be expected' to the 5GC in the AF request, as described above with reference to FIG. 13. The SMF 310 may then configure the PSA according to the updated N6 traffic routing information (included in the response sent from the AF to the SMF) to ensure proper N6 traffic routing in the UL.

When Point-to-Point (PtP) tunnel is used for N6 traffic routing, the 5GC-DN negotiation enables the DN 310 and the 5GC to exchange tunnel end point information (e.g. IP address and port in the case of IP/UDP tunnel as described in 3GPP TS23.501, clause 5.6.10.3) as N6 tunnel changes for UP efficiency reason. The AF 322 can perform necessary configuration in the DN 306 so that DL traffic can be routed to the right PSA via the N6 tunnel, regardless of the type of traffic, whether IP or non-IP. In the case of IP traffic, because UE IP address is not used for N6 traffic routing, UE IP address can therefore be preserved when the UPF is reselected. This provides a means of ensuring upper layer session and service continuity.

According to the IP address preservation indication and the AF subscription information in the AF request, the SMF 310 may determine whether to achieve IP address preservation through the coordination between 5GCN and the AF 322 described above. For example, if the AF 322 does not subscribe to notifications of UP path management event, the SMF 310 will choose not to achieve it through such coordination (as the coordination is not available); in that case, the SMF 310 may prevent reselection or relocation of PSA as described above. In some embodiments, the IP address preservation indication may be part of some policy (e.g. DN policy) related to the PDU Session and preconfigured in the SMF 310.

For an IP-type PDU Session with IP address preservation to be applied, during establishment of the PDU Session the SMF 310 allocates to the UE an IP address obtained from a globally-managed IP address pool within the PLMN. After the PDU Session is established, N6 traffic routing and UP path efficiency are maintained for the PDU Session via the AF influence feature, and the IP address is preserved for the UE 102. When the PDU Session is released, the IP address is released to the SMF 310, which in turn releases the IP address to the global IP address pool for future use.

For an IP-type PDU Session, the UE IP address is associated with a PSA, for example PSA1. When the PSA is reselected, e.g. due to UE mobility, the IP address is reallocated to be associated with the new PSA. This may break upper layer session continuity, for example, when application layer session is based on TCP, unless application layer mobility management is in place.

Three session and service continuity (SSC) modes are developed to provide three levels of support of session and service continuity, according to some embodiments. It is noted that some embodiments only include a subset of these modes. The SSC mode 2 breaks IP continuity. The analysis is focused on SSC modes 1 and 3.

Figure 14A:
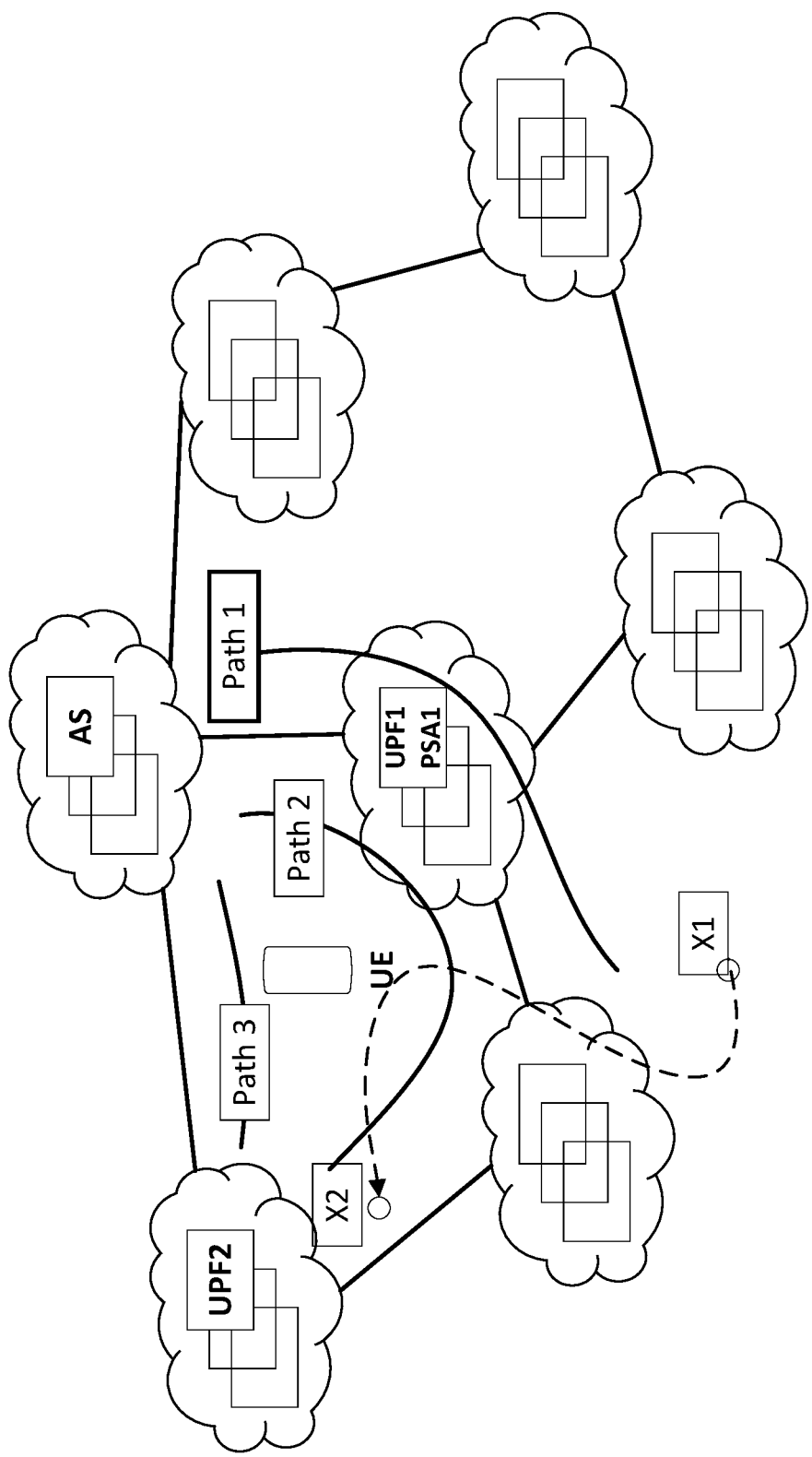
FIG. 14A is an illustration of UP inefficiency analysis for SSC modes 1 and 3 with UE mobility without application relocation.

Referring to FIG. 14A, the SSC mode 1 maintains the initial PSA (PSA1). This may corresponds to a case that an AF associated with the AS has sent an indication that a UE IP address associated with the traffic should be preserved. It should be appreciated that one way for the network to preserve the IP address is to preserve the PSA. Maintaining the PSA1 (i.e., preventing reselection of the PSA) preserves IP continuity for the IP address associated with the initial PSA1, and therefore preserves session continuity. In other words, SSC mode 1 prevents reselection (and/or relocation) of the PSA for a PDU session once the PSA is initially selected, for example PSA1. It should be understood that this can limit or reduce the UP efficiency for the traffic using that IP address. The SSC mode 3 offers support of session continuity and UP efficiency both to a limited extent.

With SSC mode 3, the old PSA1 is kept for ongoing traffic for a period of time. During this period, the ongoing traffic may go through an inefficient path. The old PSA1 and the UE IP address associated to it are released as soon as a timer expires. This breaks session continuity if the ongoing traffic has not finished by the time the IP address is released. If the network knows when the ongoing traffic will finish, it may delay the release. But nevertheless, this knowledge is very difficult, if not impossible, to obtain.

An example of limitation of SSC modes 1 and 3 in terms of potential UP efficiency is illustrated by referring to FIG. 14A. In this example, the UE is moving from location X1 to location X2. At location X1, the efficient UP path (Path 1) connecting the UE and the application is established through the UPF1 (PSA1). As the UE moves to location X2, the UE moves closer (in terms of network topology) to UPF2. Accordingly, from a traffic engineering perspective, at location X2, it is more efficient to connect the UE to the AS through UPF 2 (e.g, through Path 3), rather than through UPF1. However, with SSC mode 1, at location X2 the UP path is maintained through the initial UPF1 (PSA1), e.g. due to the previously transmitted AF indication. That is, Path 2 is used for connecting the UE and the application, which is less efficient than Path 3 via the UPF2. With SSC mode 3, the ongoing traffic is migrated from Path 2 to Path 3 after the timer expires.

In some embodiments, the SMF may receive a trigger to modify the UP path of a PDU Session which would include a PSA reselection for the PDU Session. In other words, the SMF receives a trigger which would cause the SMF to modify the UP path of the PDU Session, and the modified UP path would typically involve reselecting a PSA of the PDU Session. However, if the SMF has received an indication to preserve a UE IP address associated with the PSA for the PDU Session, e.g. from a PCF as described in the embodiments associated with FIG. 15, then, in response, the SMF is configured to keep the current UP path unchanged or select a new UP path which still uses or includes the PSA. Examples of such a trigger can include a UE location change, a policy change that impacts path selection, a request for PDU Session modification, a request for changing path, etc. For example a CNF, for example a traffic engineering (TE) NF, may send a TE request to the SMF to make a change to the PDU session. For example, the TE request may be a request to change the path of the UE from Path 1 to Path 3 as the UE moves towards X2. However, as the PCC rules received by the SMF indicate that the IP address is to be preserved, the SMF prevents reselection of the PSA, by selecting a path that includes the PSA1. Accordingly, in some embodiments, the SMF selects path 2 (e.g., moving the UE to path 2) through the PSA1, rather than though UPF2, as indicated in the TE request. In some embodiments, the SMF sends a response to the TE NF that it has not made the requested change.

Figure 14B:
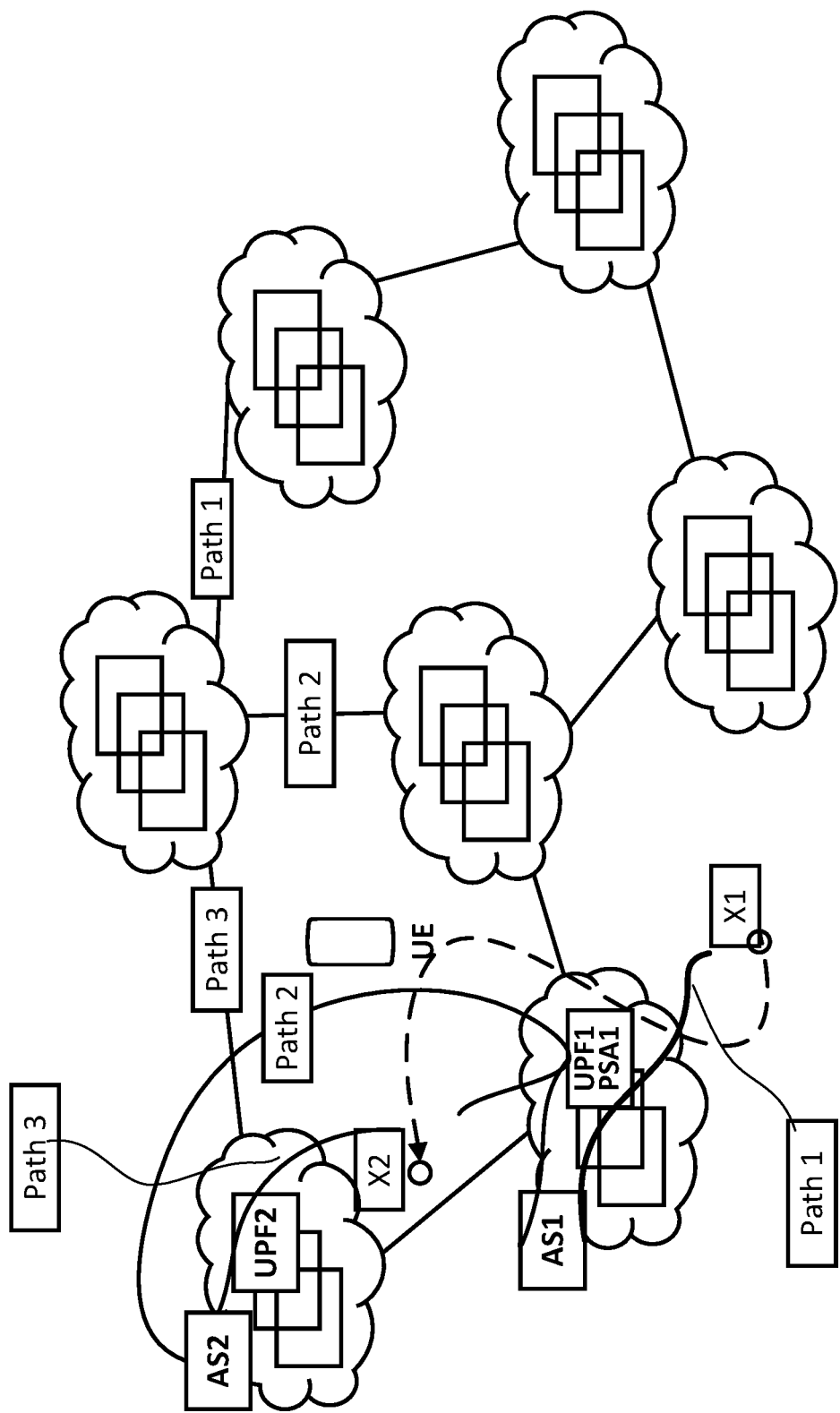
FIG. 14B is an illustration of UP inefficiency analysis for SSC modes 1 and 3 with UE mobility with application relocation.

In FIG. 14B, where application relocation occurs, Path 2 connects to the new location of the application for SSC mode 1 and may connect to either the old location and/or the new location, depending on whether application relocation is completed before the timer expiry.

Another aspect of the disclosure provides for a method for coordination between an application function (AF) and a network including a session management function (SMF). The method includes sending, by the AF, a subscription request to subscribe to a notification of a UP path management event from the SMF, the request including an indication that indicates the network is to wait for an AF response associated with the notification. The method further includes receiving, by the AF, the notification of the UP path management event from the SMF. The method further includes sending the AF response in response to the received notification. In some embodiments, the notification is sent to enable management of a UP path associated with the UP path management event. In some embodiments, the method further includes receiving, by the SMF, a PCC rule which is generated by the PCF according to the request received from the AF. In some embodiments, the method further includes sending, by the SMF, the notification to the AF. In some embodiments, the method further includes receiving, by the SMF, the AF response. In some embodiments, further includes managing according to the AF response, by the SMF, a UP path associated with the UP path management event. In some embodiments, the AF response is a positive response, and managing the UP path includes at least one of: configuring, by the SMF, a new UP path associated with the UP path management event, and releasing, by the SMF, the UP path. In some embodiments, the AF response is a negative response, and managing the UP path includes maintaining, by the SMF, the UP path associated with the UP path management event. In some embodiments, before receiving the AF response, the SMF maintains the UP path.

Another aspect of the disclosure provides for a method for coordination between an application function (AF) and a network including a session management function (SMF). The method includes receiving, by the SMF, a policy and charging control (PCC) rule, the PCC rule includes information on an AF subscription (e.g., an AF request to subscribe) to a notification of a user plane (UP) path management event and including an indication that indicates the network is to wait for an AF response associated with the notification. The method further includes sending, by the SMF, a UP path management event notification to the AF. The method further includes waiting, by the SMF, for a response to the UP path management event notification from the AF, before implementing the UP path management event. In some embodiments, the path management event includes configuring a new UP path, and waiting includes maintaining an old UP path until the response is received. In some embodiments, the SMF sends the UP path management event notification to the AF via a network exposure function (NEF).

Another aspect of the disclosure provides for a method of user plane (UP) path (re)selection management, by a core network function (CNF). The method includes receiving correlation information and user equipment (UE) mobility information. The method further includes identifying Protocol Data Unit (PDU) sessions that are correlated based on received information. The method further includes (re)selecting one of a UPF or a DNAI for the PDU sessions according to the received information, the UPF or the DNAI being associated with one or more UP path. The method further includes sending information identifying the (re)selected UPF or DNAI to a plurality of SMFs, each of the SMFs serving one of the PDU sessions. In some embodiments, the correlation information includes at least one of: PDU session correlation, correlation type, and correlation purpose. In some embodiments, the correlation type is one of a joint data network access identifier (DNAI) reselection and a joint UP function (UPF) (re)selection. In some embodiments, the correlation purpose is one of multicasting, anycasting and unicasting. In some embodiments, the correlation information and the user mobility information are received from the plurality of SMFs. In some embodiments, the correlation information is included in a policy and charging control (PCC) rule from a plurality of policy control functions (PCFs) each of which being associated with one of the plurality of SMFs. In some embodiments, the correlation information is received from one or more AFs. In some embodiments, the user mobility information is received from a plurality of policy control functions (PCFs), each of which being associated with one of the plurality of SMFs. In some embodiments, the CNF sends the information identifying the (re)selected UPF or DNAI to the plurality of SMFs as part of policy and charging control (PCC) rules via one or more of the plurality of the PCFs, each of which serving one or more of the SMFs. In some embodiments, such a method applies to PDU sessions that are to be correlated.

Another aspect of the disclosure provides for an application function (AF) for coordinating with a network including a session management function (SMF), the AF including at least one network interface, at least one processor, and a non-transient computer readable memory for storing instructions which when executed by the at least one processor configure the AF to execute methods disclosed herein. For example, such an AF is configured for sending a subscription request to subscribe to a notification of a UP path management event from the SMF, the request including an indication that indicates the network is to wait for an AF response associated with the notification. The AF is further configured for receiving the notification of the UP path management event from the SMF. The AF is further configured for sending the AF response in response to the received notification. In some embodiments, the notification is sent to enable management of a UP path associated with the UP path management event.

Another aspect of the disclosure provides for a system including an application function (AF), and a session management function (SMF). The AF configured for sending a subscription request to subscribe to a notification of a UP path management event from the SMF, the request including an indication that indicates the network is to wait for an AF response associated with the notification. The AF is further configured for receiving, the notification of the UP path management event from the SMF. The AF is further configured for sending the AF response in response to the received notification. The SMF configured for receiving, by the SMF, a policy and charging control (PCC) rule, the PCC rule indicating the AF subscription request. The SMF is further configured for sending, the notification of the UP path management event to the AF. The SMF is further configured for waiting, for a response from the AF, before implementing the UP path management event. In some embodiments, the system further including a policy control function (PCF) configured for receiving the AF request from the AF, generating the PCC rule, and sending the PCC rule to the SMF. In some embodiments the SMF is configured for, before receiving the AF response, maintaining the UP path.

Another aspect of the disclosure provides for a core network function (CNF) including at least one network interface, at least one processor, and a non-transient computer readable memory for storing instructions which when executed by the at least one processor configure the CNF to execute the methods described here. For example, such a CNF is configured for receiving correlation information and user equipment (UE) mobility information. The CNF is further configured for identifying Protocol Data Unit (PDU) sessions that are correlated based on received information. The CNF is further configured for (re)selecting one of a UPF or a DNAI for the PDU sessions according to the received information, the UPF or the DNAI being associated with one or more UP path. The CNF is further configured for sending information identifying the (re)selected UPF or DNAI to a plurality of SMFs, each of the SMFs serving one of the PDU sessions. In some embodiments, the correlation information includes at least one of: PDU session correlation, correlation type, and correlation purpose. In some embodiments the correlation type is one of a joint data network access identifier (DNAI) reselection and a joint UP function (UPF) (re)selection. In some embodiments, the correlation purpose is one of multicasting, anycasting and unicasting. In some embodiments, the correlation information and the user mobility information are received from the plurality of SMFs. In some embodiments, the correlation information is included in a policy and charging control (PCC) rule from a plurality of policy control functions (PCFs) each of which being associated with one of the plurality of SMFs. In some embodiments, the correlation information is received from one or more AFs. In some embodiments, the user mobility information is received from a plurality of policy control functions (PCFs), each of which being associated with one of the plurality of SMFs. In some embodiments, the CNF sends the information identifying the (re)selected UPF or DNAI to the plurality of SMFs as part of policy and charging control (PCC) rules via one or more of the plurality of the PCFs, each of which serving one or more of the SMFs.

Another aspect of the disclosure provides for a system for user plane (UP) path (re)selection management for a plurality of Protocol Data Unit (PDU) sessions. The system includes a core network function (CNF), and a plurality of SMFs, each of the SMFs serving one of the PDU sessions. The CNF is configured for receiving correlation information and user equipment (UE) mobility information. The CNF is further configured for identifying Protocol Data Unit (PDU) sessions that are correlated based on received information. The CNF is further configured for (re)selecting one of a UPF or a DNAI for the PDU sessions according to the received information, the UPF or the DNAI being associated with one or more UP path. The CNF is further configured for sending information identifying the (re)selected UPF or DNAI to a plurality of SMFs, each of the SMFs serving one of the PDU sessions. The plurality of the SMFs configures the path of the respective PDU session according to the information received from the CNF.

An aspect of the disclosure provides for a control plane function. The control plane function including at least one processor. The control plane function further including a non-transitory computer readable memory storing software instructions configured to control the at least one processor to execute a process to receiving an identification of two or more correlated PDU sessions. The control plane function further including a non-transitory computer readable memory storing software instructions configured to control the at least one processor to execute a process to further interacting with one or more session management functions (SMFs) to correlate respective user plane paths of the correlated PDU sessions. In some embodiments, the control plane function the receiving an identification of two or more correlated PDU sessions includes receiving information associated with an Application Function (AF) request message including at least one of a correlation identifier, an indication of a correlation type; and an indication of a correlation purpose. In some embodiments, the indication of correlation type includes an indication of any one or more of joint user plane function (UPF) selection or reselection and joint data network access indicator (DNAI) selection or reselection. In some embodiments, the indication of correlation type includes an indication of joint UPF selection or reselection. In some embodiments the interacting with one or more SMFs to correlate respective user plane paths includes, when the correlation identifier comprises an indication of support for URLLC service, selecting a distinct UPF for each of the correlated PDU sessions, and causing each SMF to implement a respective UP path associated with each correlated PDU session such that the respective UP paths traverse the selected distinct anchor UPF. In some embodiments, the interacting with one or more SMFs to correlate respective user plane paths includes, when the correlation identifier includes an indication of other than support for URLLC service, selecting a common anchor UPF for each of the correlated PDU sessions, and causing each SMF to implement a respective UP path associated with each correlated PDU session such that the respective UP paths traverse the selected common anchor UPF. In some embodiments, the indication of correlation type includes an indication of joint DNAI selection or reselection. In some embodiments the interacting with one or more SMFs to correlate respective user plane paths includes, when the correlation identifier comprises an indication of support for URLLC service selecting a distinct DNAI for each of the correlated PDU sessions and causing each SMF to implement a respective UP path associated with each correlated PDU session using the selected distinct DNAI. In some embodiments, the interacting with one or more SMFs to correlate respective user plane paths includes, when the correlation identifier comprises an indication of other than support for URLLC service, selecting a common DNAI for the correlated PDU sessions, and causing each SMF to implement a respective UP path associated with each correlated PDU session using the selected common DNAI.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for user equipment (UE) internet protocol (IP) address management, the method comprising:
sending by an application function (AF), a request to a policy control function (PCF), the request including information identifying traffic and an indication that a UE IP address associated with the traffic should be preserved;
sending by the PCF, to a session management function (SMF) being responsible for managing a protocol data unit (PDU) session associated with the traffic, a policy and charging control (PCC) rule including the indication.

2. The method of claim 1, wherein the request is sent by the AF to the PCF via a network exposure function (NEF).

3. The method of claim 1, wherein the method further comprises: managing, by the SMF, the UE IP address according to the PCC rule.

4. The method of claim 3, wherein managing comprises preserving the UE IP address for the PDU session associated with the traffic.

5. The method of claim 3, wherein managing comprises preventing reselection of a PDU session anchor (PSA) for the traffic.

6. The method of claim 5, wherein preventing reselection of the PSA comprises:
receiving a trigger to modify a path which would include a PSA reselection;
in response, selecting a new path which includes the PSA.

7. A method for user equipment (UE) internet protocol (IP) address management, the method performed by a session management function (SMF) configured to manage a protocol data unit (PDU) session associated with traffic, the method comprising:
receiving a policy and charging control (PCC) rule from a policy control function (PCF), the PCC rule including an indication that a UE IP address associated with the traffic should be preserved; and
managing the UE IP address according to the PCC rule, the managing comprising at least one of:
preserving the UE IP address for a PDU session associated with the traffic; and
preventing reselection of a PDU session anchor (PSA) for the traffic.

8. The method according to claim 7, wherein the PCC rule is associated with a request from an application function (AF), the request comprising information identifying the traffic and the indication.

9. The method according to claim 7, wherein the PSA is a user plane function (UPF) through which a user plane (UP) path of the PDU session is connected to a data network (DN).

10. A network node comprising:
   at least one network interface;
   at least one processor;
   a non-transient computer readable memory for storing instructions which when executed by the at least one processor configure the network node for:
   receiving a policy and charging control (PCC) rule from a policy control function (PCF), the PCC rule including an indication that a user equipment (UE) internet protocol (IP) address associated with traffic should be preserved; and
   managing the UE IP address according to the PCC rule, the managing comprising at least one of:
   preserving the UE IP address for a protocol data unit (PDU) session associated with the traffic; and
   preventing reselection of a PDU session anchor (PSA) for the traffic.

11. The network node according to claim 10, wherein the PCC rule is associated with a request from an application function (AF), the request comprising information identifying the traffic and the indication.

12. The network node according to claim 10, wherein the PSA is a user plane function (UPF) through which a user plane (UP) path of the PDU session is connected to a data network (DN).

13. A system for user equipment (UE) internet protocol (IP) address management, the system comprising:
   an application function (AF); and
   a policy control function (PCF);
   the AF configured to send a request to a PCF, the request including information identifying traffic and an indication that a UE IP address associated with the traffic should be preserved;
   the PCF configured to send to a session management function (SMF) being responsible for managing a protocol data unit (PDU) session associated with the traffic, a policy and charging control (PCC) rule including the indication.

14. The system of claim 13, further comprising a network exposure function (NEF); and wherein the AF is configured to send the request to the PCF via the NEF.

15. The system of claim 13, further comprising the SMF, and wherein the SMF is configured for managing the UE IP address according to the PCC rule.

16. The system of claim 15, further comprising the SMF, and wherein the SMF is configured for managing the UE IP address according to the PCC rule, including preserving the UE IP address for a PDU session associated with the traffic.

17. The system of claim 15, further comprising the SMF, and wherein the SMF is configured for managing the UE IP address according to the PCC rule, including preventing reselection of a PDU session anchor (PSA) for the traffic.

* * * * *

UNITED STATES PATENT AND TRADEMARK OFFICE
CERTIFICATE OF CORRECTION

PATENT NO. : 10,904,947 B2
APPLICATION NO. : 16/412162
DATED : January 26, 2021
INVENTOR(S) : Li et al.

Page 1 of 1

It is certified that error appears in the above-identified patent and that said Letters Patent is hereby corrected as shown below:

In the Specification

Column 8, Line 11, "Function (AMF) 308 through a logical Ni" should read --Function (AMF) 308 through a logical N1--

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*